(12) United States Patent
Fan

(10) Patent No.: US 10,483,523 B2
(45) Date of Patent: Nov. 19, 2019

(54) DUAL FUNCTION CURRENT COLLECTOR

(71) Applicant: American Lithium Energy Corporation, Carlsbad, CA (US)

(72) Inventor: Jiang Fan, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 79 days.

(21) Appl. No.: 15/436,574

(22) Filed: Feb. 17, 2017

(65) Prior Publication Data

US 2017/0244093 A1  Aug. 24, 2017

Related U.S. Application Data

(60) Provisional application No. 62/297,294, filed on Feb. 19, 2016.

(51) Int. Cl.
*H01M 4/38* (2006.01)
*H01M 4/04* (2006.01)
(Continued)

(52) U.S. Cl.
CPC ....... *H01M 4/0445* (2013.01); *H01M 4/1395* (2013.01); *H01M 4/38* (2013.01); *H01M 4/382* (2013.01); *H01M 4/505* (2013.01); *H01M 4/525* (2013.01); *H01M 10/0525* (2013.01); *H01M 10/4235* (2013.01); *H01M 10/446* (2013.01);
(Continued)

(58) Field of Classification Search
CPC .......... H01M 4/04; H01M 10/42; H01M 4/38; H01M 4/382; H01M 4/505; H01M 4/525; H01M 10/0525; H01M 4/0445; H01M 10/446; H01M 4/1395; H01M 10/4235
See application file for complete search history.

(56) References Cited

U.S. PATENT DOCUMENTS

| | | | |
|---|---|---|---|
| 5,504,128 A | 4/1996 | Mizutani et al. | |
| 6,432,584 B1 * | 8/2002 | Visco ...................... | H01M 4/04 429/218.1 |

(Continued)

FOREIGN PATENT DOCUMENTS

| | | |
|---|---|---|
| DE | 102014208228 A1 | 11/2015 |
| EP | 0450549 A1 | 10/1991 |

(Continued)

OTHER PUBLICATIONS

CN 206497962 (Abstract) (Year: 2017).*
(Continued)

*Primary Examiner* — Alexander Usyatinsky
(74) *Attorney, Agent, or Firm* — Mintz Levin Cohn Ferris Glovsky and Popeo, P.C.

(57) ABSTRACT

A battery can include a separator, a first current collector, a protective layer, and a first electrode. The first current collector and the protective layer can be disposed on one side of the separator. The first electrode can be disposed on an opposite side of the separator as the first current collector and the protective layer. Subjecting the battery to an activation process can cause metal to be extracted from the first electrode and deposited between the first current collector and the protective layer. The metal can be deposited to at least form a second electrode between the first current collector and the protective layer.

19 Claims, 14 Drawing Sheets

(51) Int. Cl.

| | | |
|---|---|---|
| *H01M 4/1395* | (2010.01) | |
| *H01M 10/42* | (2006.01) | |
| *H01M 10/44* | (2006.01) | |
| *H01M 4/505* | (2010.01) | |
| *H01M 4/525* | (2010.01) | |
| *H01M 10/0525* | (2010.01) | |
| *H01M 4/131* | (2010.01) | |
| *H01M 4/136* | (2010.01) | |
| *H01M 4/66* | (2006.01) | |
| *H01M 10/0562* | (2010.01) | |
| *H01M 10/0569* | (2010.01) | |

(52) U.S. Cl.
CPC ............ *H01M 4/131* (2013.01); *H01M 4/136* (2013.01); *H01M 4/661* (2013.01); *H01M 10/0562* (2013.01); *H01M 10/0569* (2013.01)

(56) References Cited

U.S. PATENT DOCUMENTS

| | | | | |
|---|---|---|---|---|
| 2001/0041294 | A1* | 11/2001 | Chu | H01M 4/0438 |
| | | | | 429/231.9 |
| 2003/0160589 | A1 | 8/2003 | Krasnov et al. | |
| 2006/0019167 | A1 | 1/2006 | Li | |
| 2006/0099506 | A1 | 5/2006 | Krause et al. | |
| 2007/0269718 | A1 | 11/2007 | Krause et al. | |
| 2010/0129699 | A1* | 5/2010 | Mikhaylik | H01M 2/1653 |
| | | | | 429/50 |
| 2014/0272564 | A1 | 9/2014 | Holme et al. | |
| 2015/0102530 | A1 | 4/2015 | Wallace et al. | |
| 2016/0190566 | A1* | 6/2016 | Shiozaki | H01M 4/366 |
| | | | | 429/231.1 |
| 2018/0198114 | A1* | 7/2018 | Bonhomme | H01M 4/0471 |

FOREIGN PATENT DOCUMENTS

| | | | |
|---|---|---|---|
| EP | 1246280 | * | 2/2002 |
| EP | 1246280 | A2 | 10/2002 |

OTHER PUBLICATIONS

CN 206497962 MT (Year: 2017).*
Eichstadt, Amy E., et al. "Structure-Property Relationships for a Series of Amorphous Partially Aliphatic Polyimides." *Journal of Polymer Science Part B: Polymer Physics* 40.14 (2002): pp. 1503-1512.
Fang, Xingzhong, et al. "Synthesis and properties of polyimides derived from cis-and trans-1, 2, 3, 4-cyclohexanetetracarboxylic dianhydrides." *Polymer* 45.8 (2004): pp. 2539-2549.
Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): pp. 1921-1926.
Loncrini, D. F., and J. M. Witzel. "Polyaryleneimides of meso- and dl-1, 2, 3, 4-Butanetetracarboxylic Acid Dianhydrides." *Journal of Polymer Science Part A-1: Polymer Chemistry* 7.8 (1969): pp. 2185-2193.
Matsumoto, Toshihiko. "Aliphatic polyimides derived from polyalicyclic monomers." *High Performance Polymers* 13.2 (2001): pp. S85-S92.
Schab-Balcerzak, E., et al. "Synthesis and characterization of organosoluble aliphatic-aromatic copolyimides based on cycloaliphatic dianhydride." *European Polymer Journal* 38.3 (2002): pp. 423-430.
Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): pp. 3584-3590.
Seino, Hiroshi, et al. "Synthesis of fully aliphatic polyimides." *High Performance Polymers* 11.3 (1999): pp. 255-262.

* cited by examiner

DUAL FUNCTION CURRENT COLLECTOR

RELATED APPLICATION

This application claims priority under 35 U.S.C. § 119(e) to U.S. Provisional Patent Application No. 62/279,294 file on Feb. 19, 2016 and entitled DUAL FUNCTION CURRENT COLLECTOR, the disclosure of which is incorporated herein by reference in its entirety.

TECHNICAL FIELD

The subject matter described herein relates generally to battery technologies and more specifically to current collectors.

BACKGROUND

Lithium (e.g., lithium-ion) batteries typically include an electrode formed from lithium metal. For instance, lithium metal may be used to form the anode (e.g., negative electrode) of a lithium battery cell. Lithium metal may be an ideal material for the anode of a lithium battery cell due to the high specific capacity of lithium metal. Notably, at approximately 4400 milliampere-hours per gram (mAh/g), the specific capacity of lithium metal is more than ten times higher than that of graphite, which has a specific capacity of only 372 mAh/g.

SUMMARY

Systems, methods, and articles of manufacture, including batteries and battery components, are provided. In some implementations of the current subject matter, there is provided a battery. The battery can include a separator, a first current collector, a protective layer, and a first electrode. The first current collector and the protective layer can be disposed on one side of the separator. The first electrode can be disposed on an opposite side of the separator as the first current collector and the protective layer. Subjecting the battery to an activation process can cause metal to be extracted from the first electrode and deposited between the first current collector and the protective layer. The metal can be deposited to at least form a second electrode between the first current collector and the protective layer.

In some variations, one or more features disclosed herein including the following features can optionally be included in any feasible combination. The activation process can include charging the battery. The activation process can include charging the battery at less than ½ C rate and/or greater than 2 volts. The first current collector can be copper (Cu) and/or plated copper. The first current can be copper foil, stainless steel foil, titanium (Ti) foil, nickel (Ni) plated copper foil, aluminum (Al) plated copper foil, and/or titanium plated copper foil. The first current collector can have a thickness of 10 microns. The first electrode can be formed from a metal oxide, a metal fluoride, a metal sulfide, and/or a doped salt. The first electrode can be formed from a lithium cobalt oxide ($LiCoO_2$), lithium nickel cobalt oxide ($LiNiCoO_2$), lithium manganese nickel cobalt oxide ($LiNiMnCoO_2$), lithium manganese silicon oxide ($Li_2MnSiO_4$), lithium iron phosphate ($LiFePO_4$), lithium fluoride ($LiF$), and/or lithium sulfide ($Li_2S$). The metal extracted from the first electrode can be lithium metal.

In some variations, the protective layer can be formed from a polymer. The protective layer can be formed from a crosslinked polymer and/or a non-crosslinked polymer. The protective layer can be formed from a polymer composite that includes a plurality of different polymers. The polymer composite can further include one or more additives, the one or more additives comprising ceramic particles, metal salt particles, and metal stabilizers.

In some variations, the battery can further include an electrolyte. The electrolyte can be a liquid electrolyte, the liquid electrolyte including metal ions, and the liquid electrolyte further including one or more organic solvents. The metal irons can include lithium ions, and wherein the one or more organic solvents comprise ethylene carbonate (($CH_2O)_2CO$) and/or lithium hexafluorophosphate ($Li_1PF_6$). The electrolyte can be a solid-state electrolyte. The solid-state electrolyte can be a glass-ceramic binary sulfide electrolyte and/or a polymer electrolyte.

In some variations, the battery can further include a second current collector, the second current collector being coupled with the first electrode. The battery can further include a safety layer, the safety layer being deposited on the second current collector, and the safety layer being configured to respond to a temperature trigger and/or a voltage trigger.

In some variations, the metal extracted from the first electrode and deposited between the first current collector and the protective layer can include dendrites. The protective layer can be configured to prevent the dendrites from penetrating the separator and causing an internal short within the battery.

In some variations, the activation process can cause a reduction at the first electrode, the reduction extracting metal from the first electrode, and the metal extracted from the first electrode being deposited between the first current collector and the protective layer to form the second electrode in situ between the first current collector and the protective layer.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
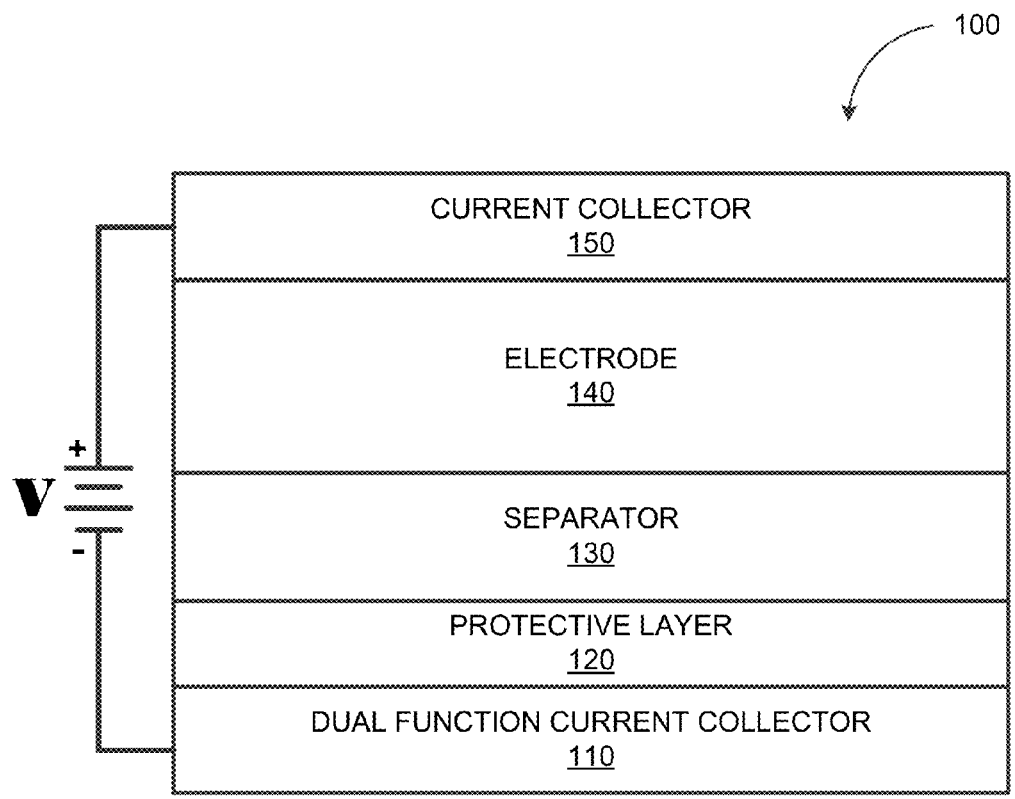
FIG. 1A depicts a schematic diagram illustrating a battery cell consistent with implementations of the current subject matter.

Lithium metal may be an ideal material for battery electrodes (e.g., anodes) due to the very high specific capacity (e.g., approximately 4440 mAh/g) of lithium metal. However, forming battery electrodes from lithium metal tends to be challenging in part because the low density of lithium metal renders the material especially fragile and difficult to handle during the production process. For instance, lithium has a density of approximately 0.534 grams per cubic centimeter ($g/cm^3$) while copper has a density of approximately 8.7 $g/cm^3$. As such, a large amount of lithium metal may be required in producing lithium batteries. In particular, the lithium foil used to form battery electrodes is typically much thicker (e.g., more than 100 microns (μm)) than copper foil, which may be as thin as 6 microns. But including a large volume of lithium metal in a battery cell may incur unnecessary cost and compromise battery performance. For example, the positive electrode (e.g., cathode) in a battery may be unable to match the capacity of a negative electrode (e.g., anode) formed from a large amount of lithium metal. Here, an excess of lithium metal may occupy space within the battery cell without providing any additional capacity, thereby limiting the overall energy density of the battery cell. This excess lithium metal may further promote the formation of lithium dendrites within the battery cell (e.g., during charging of the battery cell). The presence of lithium dendrites within a battery cell may reduce the Coulombic efficiency as well as the cycle life of the battery cell. Moreover, the presence of lithium dendrites may further give rise to significant safety risks including, for example, internal shorts that may escalate into thermal runaway and explosions.

In some implementations of the current subject matter, a battery cell may include a current collector that is configured to enable an electrode (e.g., anode) to be formed from lithium metal in situ. For example, the current collector may be formed from copper (e.g., copper foil), plated copper (e.g., nickel plated copper foil, aluminum plated copper foil, and/or titanium plated copper foil), stainless steel (e.g., stainless steel foil), and/or titanium (e.g., titanium foil). According to some implementations of the current subject matter, the battery cell may be subject to an activation process during which lithium metal may be deposited on the surface of the current collector (e.g., the copper foil and/or the plated copper foil), thereby forming a lithium metal electrode (e.g., anode) in situ. For example, the cathode of the battery cell may be formed from a metal oxide (e.g., lithium cobalt oxide, lithium nickel cobalt oxide, lithium manganese nickel cobalt oxide), a doped salt (e.g., lithium iron phosphate), a metal fluoride (e.g., lithium fluoride (LiF)), a metal sulfide (e.g., lithium sulfide), and/or the like. The activation process may include charging the battery cell, thereby reducing the cathode of the battery cell. Metal that is extracted through the reduction of the cathode of the battery cell may be deposited at the anode of the battery cell (e.g., on the surface of the current collector).

In some implementations of the current subject matter, a battery cell may be subject to an activation process during which an electrode (e.g., anode) in the battery cell may be formed from lithium metal in situ. The lithium metal forming the electrode may be lithium dendrites, which may be filaments of lithium metal capable of penetrating a separator (e.g., between the anode and the cathode) in the battery cell and causing an internal short. As such, according to some implementations of the current subject matter, a current collector (e.g., the copper foil) may be further coated with a protective layer, which may also be formed in situ. This protective layer may be formed from, for example, a polymer and/or a polymer composite. Meanwhile, the lithium metal (e.g., lithium dendrites) that is extracted from the lithium metal oxide at the cathode of the battery cell may be deposited between the current collector (e.g., the copper foil) and the protective layer. The protective layer may prevent internal shorts by at least preventing the lithium dendrites forming the anode of the battery cell from penetrating the separator between the anode and the cathode of the battery cell.

In some implementations of the current subject matter, a lithium metal electrode (e.g., anode) can be formed in situ between a current collector (e.g., a copper foil and/or a plated copper foil) and a protective layer (e.g., a polymer and/or a polymer composite) of a battery cell. For example, a lithium metal anode may be formed by at least depositing, between the current collector and the protective layer, lithium metal extracted from a cathode of the battery cell during an activation process (e.g., charging of the battery cell). Forming the lithium metal electrode in situ obviates the highly inert environment required for manipulating highly reactive lithium metal (e.g., during lithium battery production). For instance, coating the surface of a lithium metal electrode with a protective layer (e.g., to prevent internal shorts) is typically performed in a dry room (e.g., with less than 2% relative humidity) in order to prevent the lithium metal from reacting with moisture present in the air. By contrast, forming a lithium metal electrode in situ eliminates these costly limitations associated with conventional lithium battery production techniques. In fact, various implementations of the current subject matter obviate the handling of highly reactive lithium metal during the production of lithium batteries. Moreover, a sufficiently thin layer of lithium metal may be deposited between the current collector and the protective layer such that the capacity of the lithium metal anode matches that of the corresponding cathode and no excess lithium metal is present in the battery cell. Producing lithium batteries in this manner can be less costly while the resulting lithium batteries can exhibit optimal overall energy density.

For clarity and conciseness, various implementations of the current subject matter are described with respect to the production of lithium batteries having electrodes formed from lithium metal. However, it should be appreciated that various implementations of the current subject matter can also be applied to the production of other types of metal batteries including, for example, sodium (Na) batteries, potassium (K) batteries, and/or the like. Thus, the techniques disclosed herein may be used to form other metal electrodes in situ, thereby obviating the handling of reactive metals during the production of metal batteries.

Figure 1B:
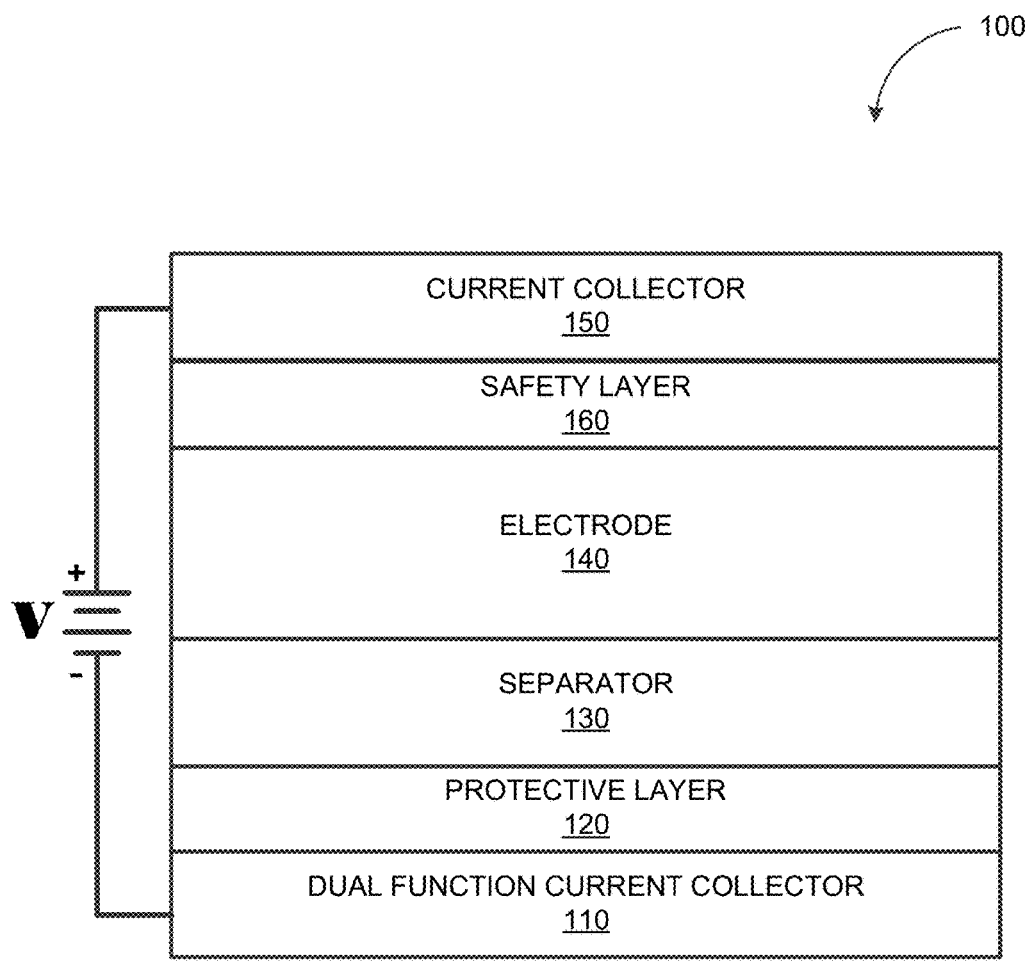
FIG. 1B depicts a schematic diagram illustrating a battery cell consistent with implementations of the current subject matter

FIG. 1A depicts a schematic diagram illustrating a battery cell 100 consistent with implementations of the current subject matter. Referring to FIG. 1B, the battery cell 100 may include a dual function current collector 110, a protective layer 120, a separator 130, a first electrode 140, and a current collector 150.

In some implementations of the current subject matter, the dual function current collector 110 can be formed from copper (Cu) and/or plated copper. For example, the dual function collector 110 may be formed from copper foil, stainless steel foil, titanium foil, nickel (Ni) plated copper foil, aluminum (Al) plated copper foil, titanium (Ti) plated copper foil, and/or the like. The foil may have a thickness of approximately 10 microns. Meanwhile, the current collector 150 may be formed from aluminum (Al) (e.g., aluminum foil) and/or the like.

In some implementations of the current subject matter, the protective layer 120 can be formed from a polymer and/or a polymer composite. For instance, the protective layer 120 may be formed from a crosslinked polymer (e.g., containing crosslinking agents such as polyhedral oligomeric silsesquioxane (POSS), carboxymethyl cellulose (CMC), methacrylate, and/or the like), a non-crosslinked polymer, a stiff polymer (e.g., polyamide imide (PAI)), a block polymer, a composite of different polymers, and/or the like. Alternately and/or additionally, the protective layer 120 may be formed from a composite of one or more polymers and at least one additive including, for example, conductive and/or nonconductive ceramic particles, lithium salt particles (e.g., lithium fluoroborate ($LiBF_4$ and/or $LiPF_6$), lithium nitrate ($LiNO_3$), lithium bis(fluorosulfonyl)imide, and/or lithium bis(perfluoroethanesulfonyl)imide), lithium metal stabilizers (e.g., vinyl carbonate), and ether solvents, and/or the like. As shown in FIG. 1, the protective layer 120 may be applied directly to the surface of the dual function current collector 110. According to some implementations of the current subject matter, the protective layer 120 can be formed in situ.

In some implementations of the current subject matter, the battery cell 100 may be filled with a liquid electrolyte containing lithium ions. The liquid electrolyte may further contain one or more organic solvents including, for example, ethylene carbonate (($CH_2O)_2CO$) and/or lithium hexafluorophosphate ($Li_1PF_6$). The protective layer 120 may become ionically conductive by at least absorbing the liquid electrolyte. Alternately and/or additionally, the battery cell 100 may include a solid state electrolyte such as, for example, a lithium solid state electrolyte (e.g., lithium lanthanum titanates (LLTO), garnet-type zirconates (LLZO), lithium phosphate oxynitride (LiPON), glass-ceramics, binary lithium sulfide/diphosphorus pentasulfide ($Li_2S$—$P_2S_5$), lithium oxides ($Li_2O$—$Al_2O_3$—$TiO_2$—$P_2O_5$)), and/or a polymer electrolyte.

In some implementations of the current subject matter, the separator 130 may be formed from a porous polyethylene film. The protective layer 120 can be configured to protect the separator 130 from being penetrated by lithium dendrites forming on the surface of the dual function current collector 110, when the battery cell 100 is subject to an activation process (e.g., charging). Otherwise, an internal short can occur when lithium dendrites forming on the dual function current collector 110 penetrates the separator 130 to make contact with the first electrode 140.

In some implementations of the current subject matter, the first electrode 140 may be formed from metal oxide, a metal fluoride, a metal sulfide, and/or a doped salt. For instance, the first electrode 140 may be formed from lithium cobalt oxide ($LiCoO_2$), lithium nickel cobalt oxide ($LiNiCoO_2$), lithium manganese nickel cobalt oxide ($LiNiMnCoO_2$), lithium manganese silicon oxide ($Li_2MnSiO_4$), lithium iron phosphate ($LiFePO_4$), lithium sulfide ($Li_2S$), and/or the like. The first electrode 140 may be the cathode (e.g., positive electrode) of the battery cell 100. Here, FIG. 1 shows the battery cell 100 before the battery cell 100 is filled with an electrolyte and subject to an activation process (e.g., charging) to form a corresponding anode. However, it should be appreciated that lithium metal may be extracted from the first electrode 140 when the lithium metal oxide at the first electrode 140 is reduced during activation of the battery cell 100. The lithium metal extracted from the first electrode 140 may be deposited between the dual function current collector 110 and the protective layer 120, thereby forming a lithium metal anode in situ (not shown in FIG. 1).

FIG. 1B depicts a schematic diagram illustrating the battery cell 100 consistent with implementations of the current subject matter. Referring to FIG. 1B, the battery cell 100 may include a safety layer 160 in addition to the dual function current collector 110, the protective layer 120, the separator 130, the first electrode 140, the first safety layer 140, and the current collector 150. As shown in FIG. 1B, the safety layer 160 may be disposed between the current collector 150 and the electrode 140. The safety layer 160 may be formed from a mixture including lithium carbonate, calcium carbonate, conductive additives (e.g., carbon black), and/or binders (e.g., cross linked and/or non cross-linked binders). It should be appreciated that the safety layer 160 can be configured to respond to one or more temperature and/or voltage triggers (e.g., an excessively high temperature and/or voltage).

Figure 2:
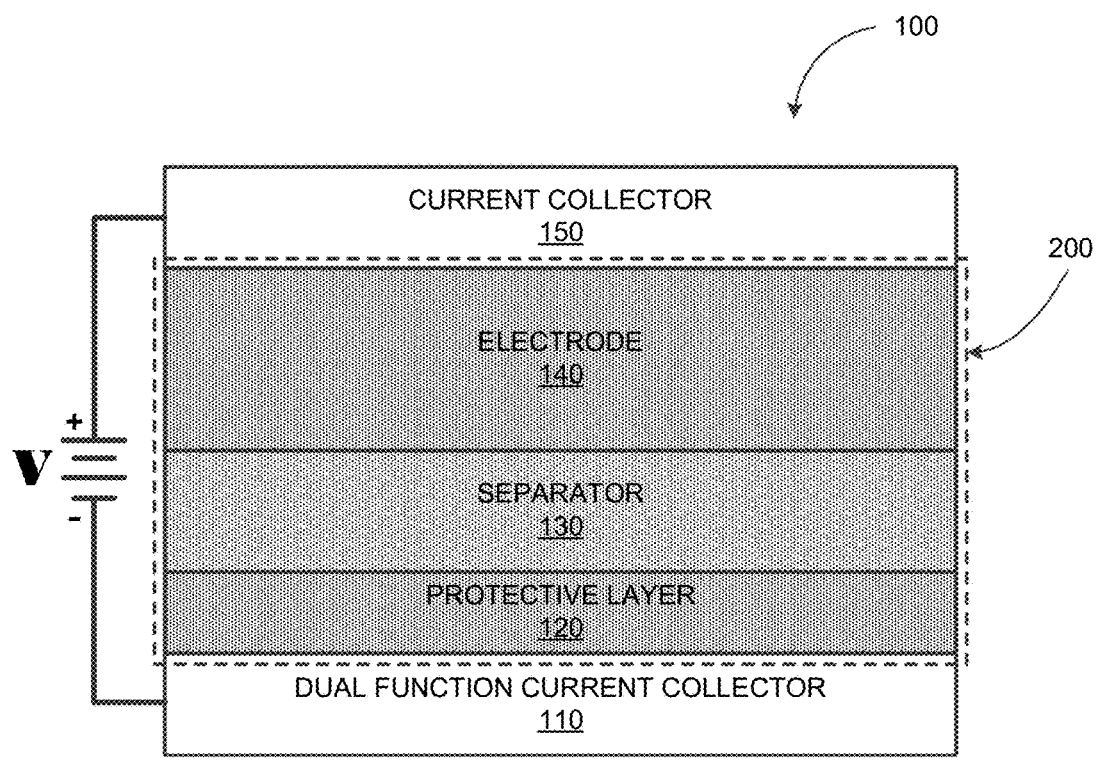
FIG. 2 depicts a schematic diagram illustrating a battery cell consistent with implementations of the current subject matter.

FIG. 2 depicts a schematic diagram illustrating the battery cell 100 consistent with implementations of the current subject matter. As shown in FIG. 2, the battery cell 100 can be filled with a liquid electrolyte 200, which can include lithium ions. The liquid electrolyte 200 can further contain organic solvents such as, for example, ethylene carbonate (($CH_2O)_2CO$), dimethyl carbonate (DMC), 1,2-dimethoxyethane, and/or lithium hexafluorophosphate ($LiPF_6$). In some implementations of the current subject matter, the liquid electrolyte 200 may saturate the protective layer 120, the separator 130, and/or the first electrode 140. In particular, the liquid electrolyte 200 may be absorbed by the polymer contained within the protective layer 120, thereby rendering the protective layer 120 and the separator 130 ionically conductive.

Figure 3:
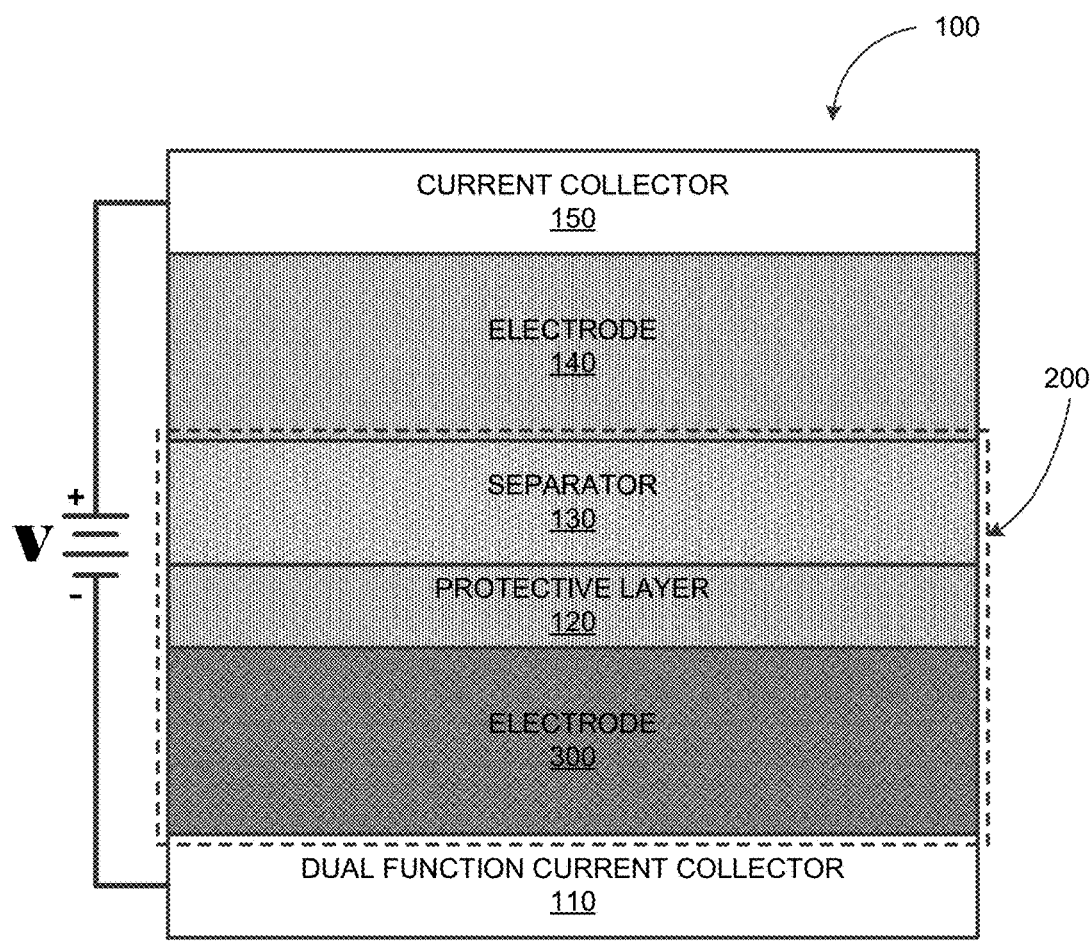
FIG. 3 depicts a schematic diagram illustrating a battery cell consistent with implementations of the current subject matter.

FIG. 3 depicts a schematic diagram illustrating the battery cell 100 consistent with implementations of the current subject matter. As shown in FIG. 3, the battery cell 100 (e.g., filled with the liquid electrolyte 200) can be further subject to an activation process in order to form a second electrode 300 in situ. For example, the battery cell 100 can be charged, thereby extracting lithium metal from the first electrode 140 by at least reducing the lithium metal oxide at the first electrode 140. The lithium metal extracted from the first electrode 140 may be deposited between the protective layer 120 and the dual function current collector 110. This lithium metal may form the second electrode 300, which may serve as the cathode of the battery cell 100.

Figure 4:
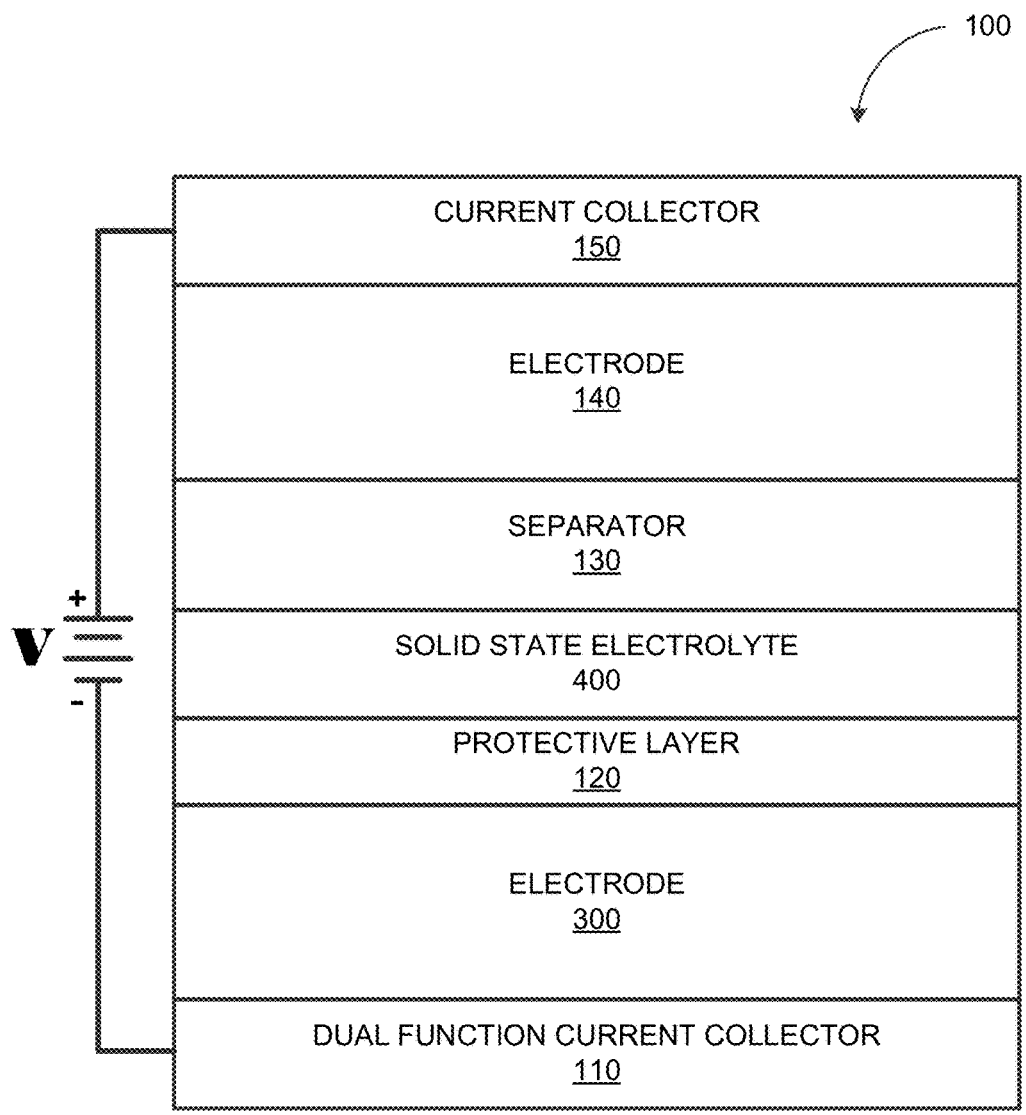
FIG. 4 depicts a schematic diagram illustrating a battery cell consistent with implementations of the current subject matter.

FIG. 4 depicts a schematic diagram illustrating the battery cell 100 consistent with implementations of the current subject matter. Referring to FIGS. 1-4, the battery cell 100 can include a solid state electrolyte 400 instead of and/or in addition to the liquid electrolyte 200. In some implementations of the current subject matter, the solid state electrolyte 400 can be a lithium solid state electrolyte (e.g., lithium lanthanum titanates (LLTO), garnet-type zirconates (LLZO), lithium phosphate oxynitride (LiPON), glass-ceramics, binary lithium sulfide/diphosphorus pentasulfide ($Li_2S$—$P_2S_5$), lithium oxides ($Li_2O$—$Al_2O_3$—$TiO_2$—$P_2O_5$)). Alternately and/or additionally, the solid state electrolyte 400 can be a polymer electrolyte, which may contain one or more crosslinking agents such as, for example, polyhedral oligomeric silsesquioxane (POSS), carboxymethyl cellulose (CMC), and/or the like. The solid state electrolyte 400 can be deposited on top the protective layer 120. According to some implementations of the current subject matter, the battery cell 100 can be subject to an activation process (e.g., charging) during which lithium metal may be extracted from the first electrode 140 (e.g., cathode). This lithium metal can be deposited between the dual function current collector 110 and the protective layer 120, thereby forming the second electrode 300 in situ.

Figure 5:
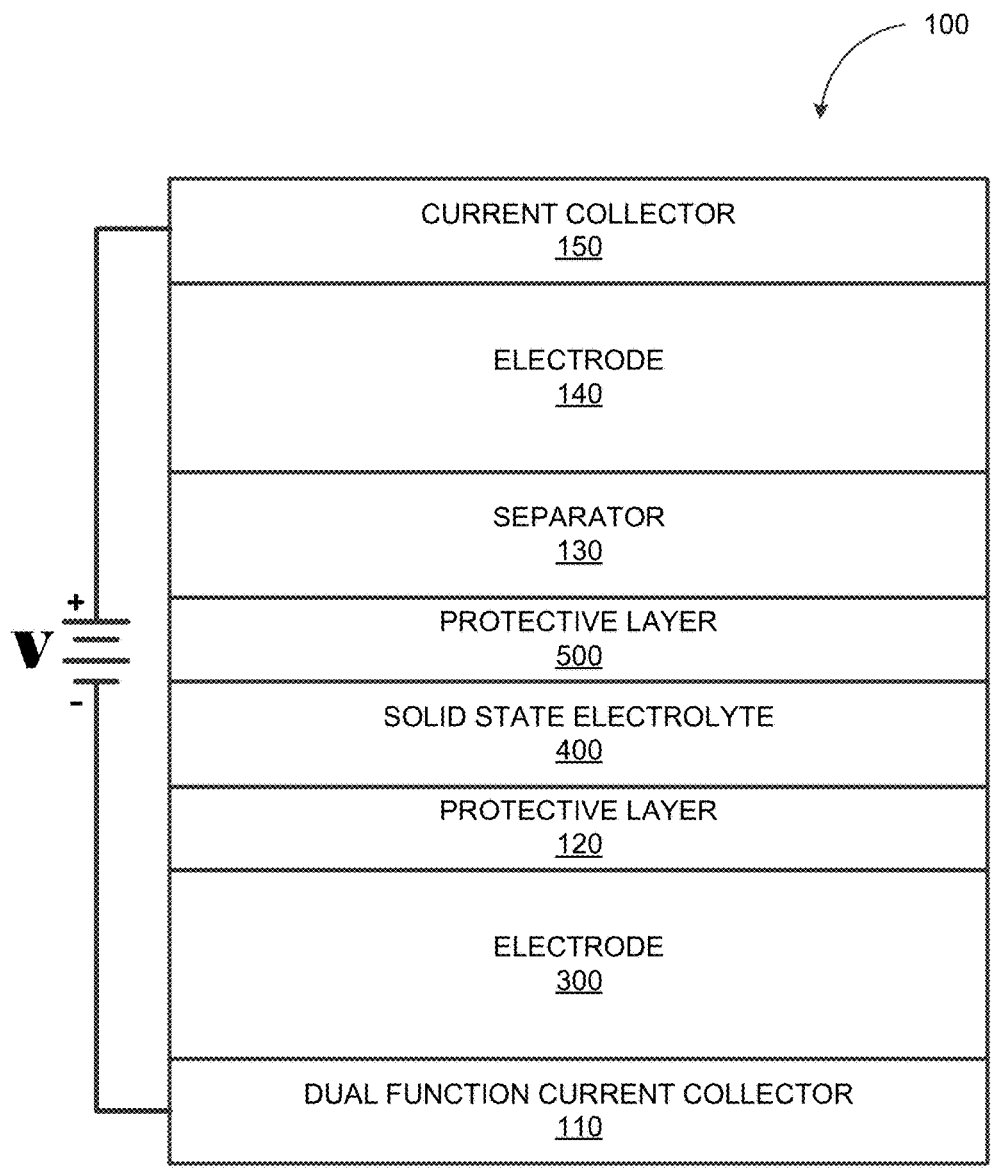
FIG. 5 depicts a schematic diagram illustrating a battery cell consistent with implementations of the current subject matter.

FIG. 5 depicts a schematic diagram illustrating the battery cell 100 consistent with implementations of the current subject matter. Referring to FIGS. 1-5, the battery cell 100 can include the solid state electrolyte 400 (e.g., instead of and/or in addition to the liquid electrolyte 200) and an additional protective layer 500 deposited on top of the solid state electrolyte 400. The additional protective layer 500 can be formed from a polymer and/or a polymer composite. For instance, the additional protective layer 500 may be formed from a crosslinked polymer (e.g., containing crosslinking agents such as polyhedral oligomeric silsesquioxane (POSS), carboxymethyl cellulose (CMC), and/or the like), a non-crosslinked polymer, a stiff polymer (e.g., polyamide imide (PAI)), a block polymer, and/or a composite of different polymers. Alternately and/or additionally, the additional protective layer 500 may be formed from a composite of one or more polymers and at least one additive including, for example, conductive and/or nonconductive ceramic particles, lithium salt particles (e.g., $LiPF_4$ and/or $LiPF_6$), lithium metal stabilizers, and/or the like.

In some implementations of the current subject matter, the battery cell 100 can be subject to an activation process (e.g., charging) during which lithium metal may be extracted from the first electrode 140 (e.g., cathode). This lithium metal can be deposited between the dual function current collector 110 and the protective layer 120, thereby forming the second electrode 300 in situ. The lithium metal forming the second electrode 300 can be lithium dendrites, which are capable of penetrating the separator 130 and giving rise to internal shorts. As such, the presence of the protective layer 120, the solid state electrolyte 400, and/or the additional protective layer 500 may prevent the lithium dendrites from penetrating the separator 130 and causing an internal short. Furthermore, the protective layer 120 and the additional protective layer 500 can also prevent the solid state electrolyte 400 from coming in contact with both the first electrode 140 and/or the second electrode 300, thereby thwarting any potential interface reaction between the solid state electrolyte 400 and the first electrode 140 and/or the second electrode 300.

Figure 6:
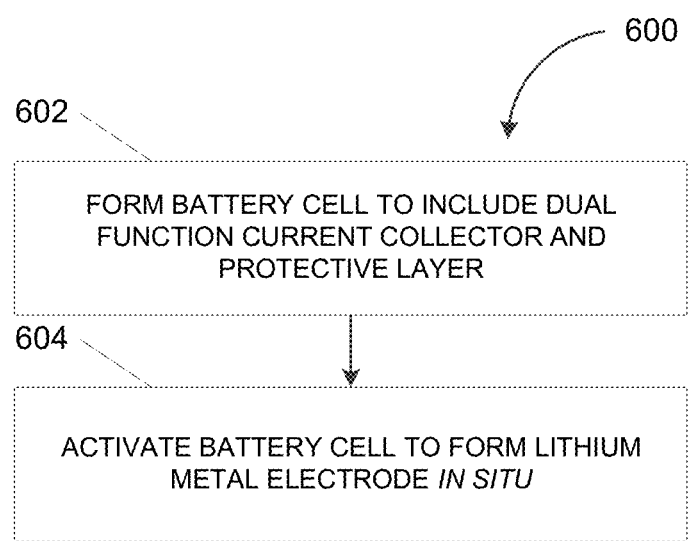
FIG. 6 depicts a flowchart illustrating a process for forming a lithium metal electrode in situ consistent with implementations of the current subject matter.

FIG. 6 depicts a flowchart illustrating a process 600 for forming a lithium metal electrode in situ consistent with implementations of the current subject matter. Referring to FIGS. 1-6, the process 400 may be performed to form the second electrode 300 in the battery cell 100.

The battery cell 100 can be formed to include the dual function current collector 110 and the protective layer 120 (602). For instance, the battery cell 100 can include the dual function current collector 110, which can be formed from copper (Cu) foil and/or plated copper foil (e.g., aluminum (Al) plated copper foil, nickel (Ni) plated copper foil, titanium (Ti) plated copper foil, and/or the like). The battery cell 100 can further include the protective layer 120, which may be formed from a crosslinked polymer (e.g., containing crosslinking agents such as polyhedral oligomeric silsesquioxane (POSS), carboxymethyl cellulose (CMC), and/or the like), a non-crosslinked polymer, a stiff polymer (e.g., polyamide imide (PAI)), a block polymer, and/or a composite of different polymers. Alternately and/or additionally, the protective layer 120 may be formed from a composite of one or more polymers and at least one additive including, for example, conductive and/or nonconductive ceramic particles, lithium salt particles (e.g., $LiPF_4$ and/or $LiPF_6$), lithium metal stabilizers, and/or the like.

In some implementations of the current subject matter, the battery cell 100 can further include the first electrode 140, which may serve as the cathode of the battery cell 100. The first electrode 140 can be formed from a lithium metal oxide (e.g., lithium cobalt oxide ($LiCoO_2$), lithium nickel cobalt oxide ($LiNiCoO_2$), lithium manganese nickel cobalt oxide ($LiNiMnCoO_2$)). As shown in FIGS. 2-5, the battery cell 100 can include the liquid electrolyte 200 and/or the solid state electrolyte 400. Moreover, the battery cell 100 can include the current collector 150, which may be formed from aluminum (Al) foil and/or the like.

The battery cell 100 can be subject to an activation process to at least form a lithium metal electrode in situ (604). For example, the battery cell 100 can be charged at a low rate (e.g., <$1/10$ C rate and/or 10 hours charging to its fully charged state) and a high voltage (e.g., >4.2 volts). Charging the battery cell 100 in this manner can cause the lithium metal oxide at the first electrode 140 to reduce, thereby extracting lithium metal from the first electrode 140. This lithium metal can be deposited between the dual function current collector 110 and the protective layer 120, thereby forming the second electrode 300 in situ. This second electrode 300 may serve as the anode of the battery cell 100. As noted above, the lithium metal deposited on the dual function current collector 110 to form the second electrode 300 may be lithium dendrites that are capable of penetrating the separator 130 to cause an internal short. As such, the battery cell 100 can include the protective layer 120 to prevent the lithium dendrites from penetrating the separator 130 and causing an internal short.

Figure 7A:
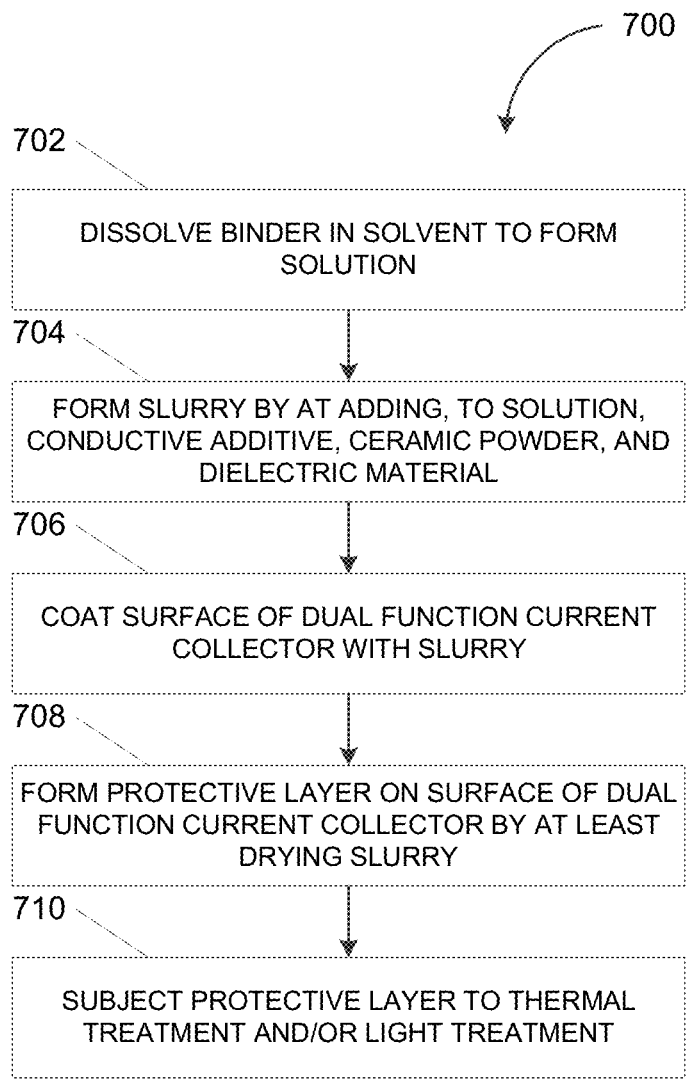
FIG. 7A depicts a flowchart illustrating a process for forming a protective layer consistent with some implementations of the current subject matter.

FIG. 7A depicts a flowchart illustrating a process 700 for forming a protective layer consistent with some implementations of the current subject matter. Referring to FIG. 7A, the process 700 may be performed to form the protective layer 120. For instance, the process 700 can be performed to form protective layer 120 from any polymer, such as, for example, a crosslinked polymer (e.g., containing crosslinking agents such as polyhedral oligomeric silsesquioxane (POSS), carboxymethyl cellulose (CMC), and/or the like), a non-crosslinked polymer, a stiff polymer (e.g., polyamide imide (PAI)), a block polymer, a composite of different polymers, and/or the like. Alternately and/or additionally, the process 700 can be performed to form the protective layer 120 from any combination of polymers and additives including, for example, conductive and/or nonconductive ceramic particles, lithium salt particles (e.g., $LiPF_4$ and/or $LiPF_6$), lithium metal stabilizers, and/or the like.

As shown in FIG. 7A, a binder solution can be formed by at least dissolving a binder into a solvent (702). A slurry can be formed by adding, to the binder solution, one or more conductive additives, ceramic powders, and/or dielectric material (704). It should be appreciated that operation 702 may be optional.

The surface of a dual function current collector can be coated with the slurry (706). For example, the slurry can be used to coat the surface of the dual function current collector 110, which may be formed from copper (Cu) foil and/or coated copper foil. A protective layer can be formed on the surface of the dual function current collector by at least drying the slurry (708). For instance, drying the slurry can form the protective layer 102 on the surface of the dual function current collector 110. It should be appreciated that the protective layer 120, the solid state electrolyte 400, and/or the additional protective layer 500 shown in FIG. 5 can be coated onto the copper foil surface at once by a slot die coating system configured with a slot die with three outputs.

In some implementations of the current subject matter, the protective layer can be further subject to thermal treatment and/or light treatment (710). For example, the protective layer 120 may be formed from a crosslinked polymer containing, for example, crosslinking agents such as polyhedral oligomeric silsesquioxane (POSS), carboxymethyl cellulose (CMC), and/or the like. As such, the protective layer 120 may be subject to thermal treatment and/or ultraviolet (UV) light treatment.

Figure 7B:
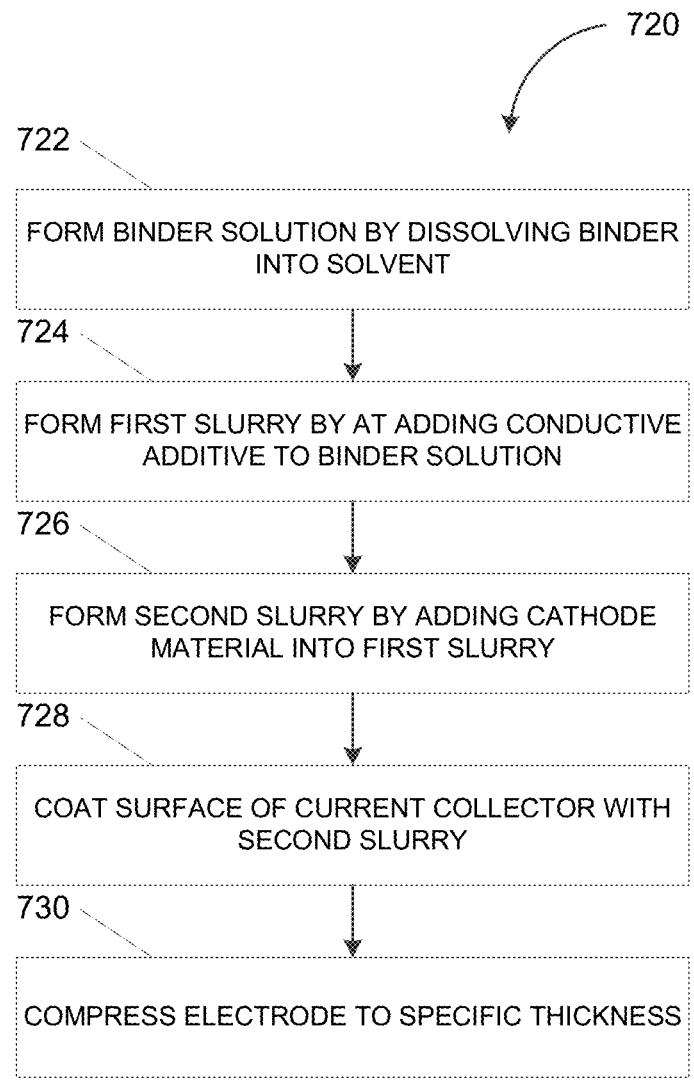
FIG. 7B depicts a flowchart illustrating a process for forming a cathode consistent with some implementations of the current subject matter.

FIG. 7B depicts a flowchart illustrating a process 720 for forming a cathode consistent with some implementations of the current subject matter. Referring to FIGS. 1-6 and 7A-B, the process 720 can be performed to form the first electrode 140. For instance, the process 720 can be performed to form the first electrode 140 from any metal oxide including, for example, a lithium metal oxide such as lithium cobalt oxide ($LiCoO_2$), lithium nickel cobalt oxide ($LiNiCoO_2$), lithium manganese nickel cobalt oxide ($LiNiMnCoO_2$), lithium iron phosphate ($LiFePO_4$), lithium sulfide ($Li_2S$), and/or the like.

As shown in FIG. 7B, a binder solution can be formed by at least dissolving a binder into a solvent (722). A first slurry can be formed by adding, to the binder solution, one or more conductive additives (724). A second slurry can be formed by adding, to the first slurry, cathode material (726). The surface of a current collector can be coated with the second slurry (728). For example, the second slurry (e.g., the electrode slurry) can be used to coat the surface of the current collector 150, thereby forming the first electrode 140 directly on the surface of the current collector 150. The electrode can be compressed to a specific thickness (730).

For instance, the first electrode 140 can be compressed to a thickness that conforms to the dimensional and/or performance specifications of the battery cell 100.

Figure 7C:
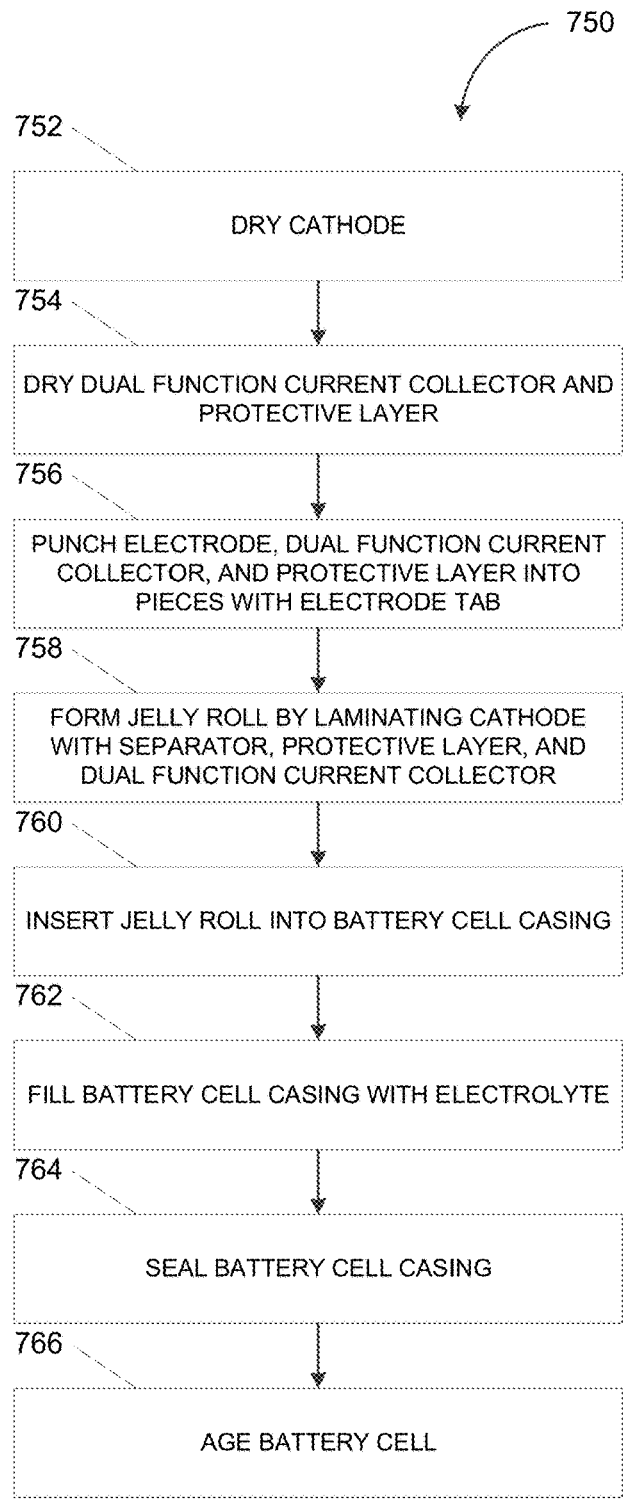
FIG. 7C depicts a flowchart illustrating a process for assembling a battery cell consistent with implementations of the current subject matter.

FIG. 7C depicts a flowchart illustrating a process 750 for assembling a battery cell consistent with implementations of the current subject matter. Referring to FIGS. 1-6 and FIGS. 7A-C, the process 750 can be performed to assemble the battery cell 100. For example, the process 750 can be performed to assemble, into the battery cell 100, the dual function current collector 110, the protective layer 120, the separator 130, the first electrode 140, and the current collector 150. It should be appreciated that the process 700, the process 720, and/or the process 750 may implement operation 602 of the process 600.

As shown in FIG. 7C, a cathode can be dried (752). For example, the first electrode 140 (e.g., metal oxide formed on top of the current collector 150 by the process 720) can be dried at 125° C. for 10 hours. A dual function current collector and protective layer can be dried (754). For instance, the dual function current collector 110 (e.g., copper foil and/or copper plated foil) and the protective layer 120 (e.g., polymer and/or polymer composite), both of which may be formed by performing the process 700, can also be dried at 125° C. for 10 hours. The cathode, the dual function collector, and the protective layer can be punched into pieces with an electrode tab (756).

In some implementations of the current subject matter, a jelly roll can be formed by laminating the cathode with a separator, the protective layer, and the dual function current collector (758). For instance, the first electrode 140 can be laminated first with the separator 130 (e.g., porous polyethylene) followed by the protective layer 120 and the dual function current collector 110. The jelly roll can be inserted into a battery cell casing (760). For example, the resulting jelly roll can be inserted into a composite bag formed from, for example, aluminum (Al). As used herein, jelly roll may refer to a structure formed by at least layering, for example, the cathode, the separator, the protective layer, and the dual function current collector.

In some implementations of the current subject matter, the battery cell casing can be filled with an electrolyte (762). For instance, the battery cell 100 can be filled with the liquid electrolyte 200, which can saturate at least the protective layer 120, the separator 130, and/or the first electrode 140. The liquid electrolyte 200 may contain metal ions such as, for example, lithium ions. Thus, filling the battery cell 100 with the liquid electrolyte 200 can render the protective layer 120 and the separator 130 ionically conductive. The battery cell casing can be sealed (764) and the battery cell can be aged (766). For example, the battery cell 100 can be sealed and aged for 16 hours. The aged battery cell 100 can subsequently be subject to an activation process (e.g., operation 604 of the process 600), during which the battery cell 100 can be charged at a low rate (e.g., $<\frac{1}{10}$ C rate or charging to its fully charged state in ten hours) and a high voltage (e.g., >4.2 volts). The aged battery cell 100 can be activated in this manner to at least form, in situ, the second electrode 300 (e.g., anode) from lithium metal extracted from the first electrode 140.

The following sample cells, sample lithium composite films, and sample protective layers are provided for illustrative purposes only. It should be appreciated that different cells, lithium composite films, and protective layers may be formed in accordance with the present disclosure.

Control Sample Cell

In some implementations of the current subject matter, the dual function current collector 110 is formed without the protective layer 120. For instance, copper (Cu) foil having a thickness of 9 microns is used to form the dual function current collector 110 without the protective layer 120.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.5}Mn_{0.3}CO_{0.2}O_2$). Here, 3 grams of a polyvinylidene fluoride (PVDF) binder and 0.2 grams of a binder BM700 (e.g., manufactured by from Zeon Corporation of Tokyo, Japan) is dissolved into 37.5 grams of N-methylpyrrolidone (NMP) to form a binder solution. Thereafter, 2.8 grams of carbon black and 1.8 grams of graphite is added to this binder solution and mixed for 15 minutes at 6500 revolutions per minute to form a first slurry. A flowable second slurry can then be formed by adding 560.4 grams of lithium nickel manganese cobalt oxide ($LiNi_{0.5}Mn_{0.3}Co_{0.2}O_2$) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the liquid solvent (e.g., N-methylpyrrolidone) present in the second slurry. When dried, the first electrode 140 and the current collector 150 can have a combined thickness of approximately 300 microns.

In some implementations of the current subject matter, the first electrode 140 is coated with an additional layer containing polyvinylidene fluoride LBG-1 from Arkema Inc. Thus, a third slurry is formed by mixing 50 grams of polyvinylidene fluoride and 50 grams of a silicon dioxide ($SiO_2$) nano powder into 500 grams of N-methylpyrrolidone, and mixing for 30 minutes at 6500 revolutions per minute. The first electrode 140 is coated with a 5 micron thick layer of this third slurry. Once dried, the first electrode 140 is compressed to a thickness of approximately 225 microns.

The dual function current collector 110 and the first electrode 140 is punched into pieces using an electrode tab that measures approximately 0.6 centimeters wide and 1 centimeter long. For example, the dual function current collector 110 (e.g., copper foil) is punched into pieces measuring 4.85 centimeters in length and 6.2 centimeters in width. Meanwhile, the first electrode 140 is punched into pieces measuring 4.7 centimeters in length and 6.0 centimeters in width. Both the dual function current collector 110 and the first electrode 140 is dried at 125° C. for 16 hours. A jelly roll is formed by laminating the dual function current collector 110, the first electrode 140, and the current collector 150 on opposite sides of the separator 130, which may be approximately 40 microns thick. As such, the resulting jelly roll may have the dual function current collector 110 on one side of the separator 130 while the first electrode 140 and the current collector 150 may be on the opposite side of the separator 130.

In some implementations of the current subject matter, the jelly roll is inserted into an aluminum composite bag, which has been dried in a vacuum oven set to 70° C. for 16 hrs. The aluminum composite bag can then be filled with an organic carbonate based liquid electrolyte containing lithium hexafluorophosphate ($LiPF_6$) before the aluminum composite bag is sealed, at 190° C., to form the battery cell 100. The sealed aluminum composite bag is allowed to rest for 16 hours before being charged, at room temperature, to 4.6V at a rate of 1/70 C rate or 70 hours to its fully charged state. The battery cell 100 is allowed to rest for 7 additional days at which point the battery cell 100 is punctured, under vacuum, to release any gases before being resealed. According to some implementations of the current subject matter, the resulting battery cell 100 can serve as a control sample.

Figure 8A:
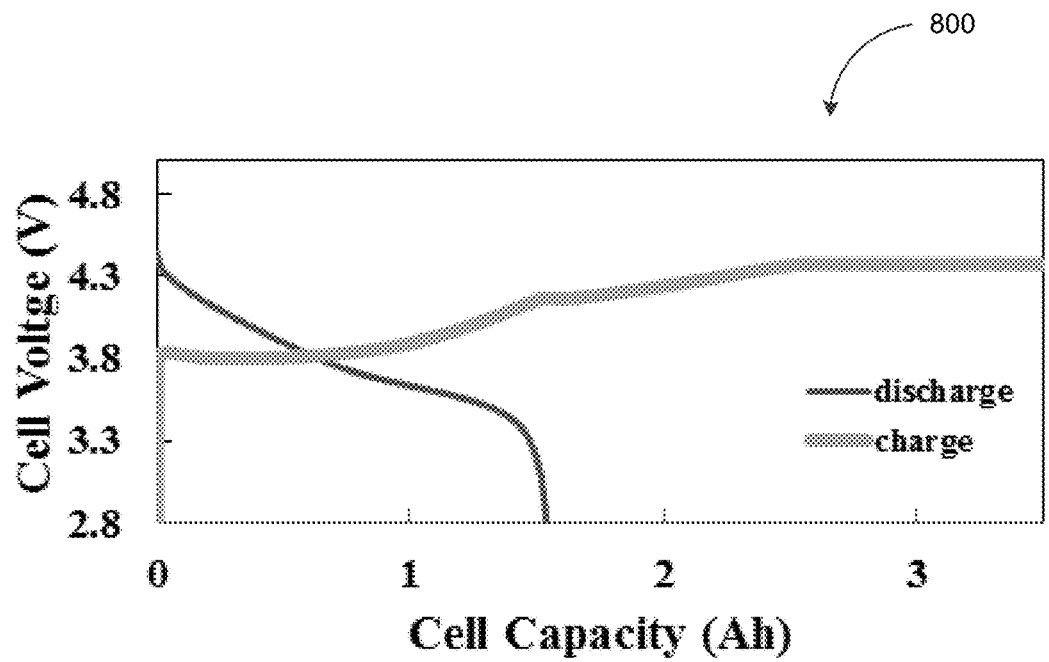
FIG. 8A depicts a line graph illustrating a charge profile and a discharge profile of a battery cell consistent with implementations of the current subject matter.

FIG. 8A depicts a line graph 800 illustrating a charge profile and a discharge profile of the battery cell 100 consistent with implementations of the current subject matter. Referring to FIG. 8A, the line graph 800 illustrates the capacity of the battery cell 100 relative to the charge voltage and the discharge voltage of the battery cell 100, as measured at room temperature. As shown in FIG. 8A, when the battery cell 100 is configured as a control sample having no protective layer on the surface of the copper foil current collector, the ratio of discharge capacity relative to charge capacity is approximately 38.75%.

Sample Cell 1

In some implementations of the current subject matter, the protective layer 120 is formed on the surface of the dual function current collector 110 by at least performing the process 700. For instance, the protective layer 120 is formed from polyethylene oxide (PEO) while the dual function current collector 110 is formed from copper (Cu) foil. As such, a binder solution is formed by dissolving the 46.5 grams of polyethylene oxide binder into 465 grams of water. Thereafter, 13.95 grams of carbon black (e.g., Super-P) is added into the binder solution and mixed for 120 minutes at 5000 revolutions per minute (RPM) to from a slurry. Here, 39.5 grams of styrene butadiene rubber (SBR) is further added to the slurry and mixed for 30 minutes at 5000 revolutions per minute. This resulting slurry is coated onto the surface of copper (Cu) foil having a thickness of 9 microns. The coating is performed using an automatic coating machine with the first heat zone set to approximately 130° C. and the second heat zone set to approximately 180° C. to remove the water present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.5}Mn_{0.3}CO_{0.2}O_2$). Here, 3.2 grams of a polyvinylidene fluoride (PVDF) binder is dissolved into 250 grams of N-methylpyrrolidone (NMP) and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 560.4 grams of lithium nickel manganese cobalt oxide ($LiNi_{0.5}Mn_{0.3}CO_{0.2}O_2$) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130. Here, the separator 130 can have a thickness of approximately 20 microns.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate (LiPF$_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/70 C rate. The activated battery cell 100 is allowed to rest for 7 additional days at which point the battery cell 100 is punctured, under vacuum, to release any gases before being resealed.

Sample Cell 2

In some implementations of the current subject matter, the protective layer 120 is formed on the surface of the dual function current collector 110 by at least performing the process 700. For instance, the protective layer 120 is formed from polyethylene oxide (PEO) while the dual function current collector 110 is formed from copper (Cu) foil. As such, a binder solution is formed by dissolving the 100 grams of polyethylene oxide binder into 1000 grams of deionized water and mixing for 120 minutes at 5000 revolutions per minute (RPM) to from a slurry. This slurry is coated onto the surface of copper (Cu) foil having a thickness of 9 microns. The coating is performed using an automatic coating machine with the first heat zone set to approximately 130° C. and the second heat zone set to approximately 180° C. to remove the water present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide (LiNi$_{0.5}$Mn$_{0.3}$CO$_{0.2}$O$_2$). Here, 3.2 grams of a polyvinylidene fluoride (PVDF) binder is dissolved into 250 grams of N-methylpyrrolidone (NMP) and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 560.4 grams of lithium nickel manganese cobalt oxide (LiNi$_{0.5}$Mn$_{0.3}$CO$_{0.2}$O$_2$) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130. Here, the separator 130 can have a thickness of approximately 40 microns.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate (LiPF$_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/70 C rate. The activated battery cell 100 is allowed to rest for 7 additional days at which point the battery cell 100 is punctured, under vacuum, to release any gases before being resealed.

Figure 8B:
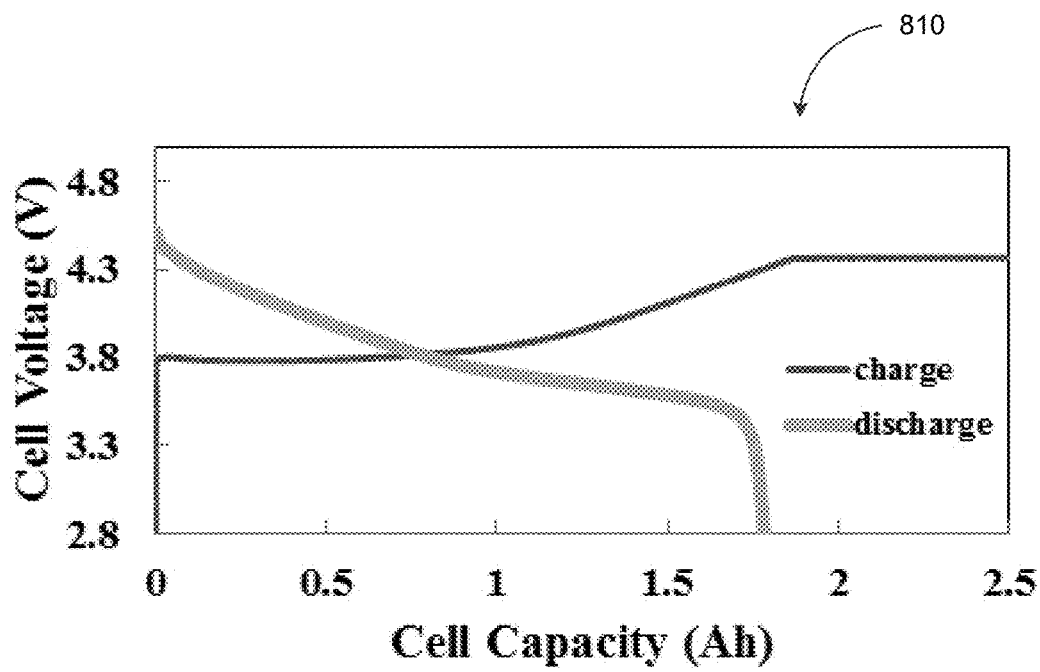
FIG. 8B depicts a line graph illustrating a charge profile and a discharge profile of a battery cell consistent with implementations of the current subject matter.

FIG. 8B depicts a line graph 810 illustrating a charge profile and a discharge profile of the battery cell 100 consistent with implementations of the current subject matter. Referring to FIG. 8B, the line graph 810 illustrates the capacity of the battery cell 100 relative to the charge voltage and the discharge voltage of the battery cell 100, as measured at room temperature. As shown in FIG. 8B, when the battery cell 100 is configured as the sample cell 2, the ratio of discharge capacity relative to charge capacity is approximately 71.2%.

Sample Cell 3

In some implementations of the current subject matter, the protective layer 120 is formed on the surface of the dual function current collector 110 by at least performing the process 700. For instance, the protective layer 120 is formed from polyethylene oxide (PEO) while the dual function current collector 110 is formed from copper (Cu) foil. As such, a binder solution is formed by dissolving the 100 grams of polyethylene oxide binder into 1000 grams of deionized water and mixing for 120 minutes at 5000 revolutions per minute (RPM) to from a slurry. This slurry is coated onto the surface of copper (Cu) foil having a thickness of 9 microns. The coating is performed using an automatic coating machine with the first heat zone set to approximately 130° C. and the second heat zone set to approximately 180° C. to remove the deionized water present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.5}Mn_{0.3}CO_{0.2}O_2$). Here, 3 grams of a polyvinylidene fluoride (PVDF) binder having a high molecular weight and 2.8 grams of carbon is dissolved into 37.5 grams of N-methylpyrrolidone (NMP) and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 92.2 grams of lithium nickel manganese cobalt oxide ($LiNi_{0.5}Mn_{0.3}Co_{0.2}O_2$) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130. Here, the separator 130 can have a thickness of approximately 25 microns.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate ($LiPF_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/70 C rate. The activated battery cell 100 is allowed to rest for 7 additional days at which point the battery cell 100 is punctured, under vacuum, to release any gases before being resealed.

Figure 8C:
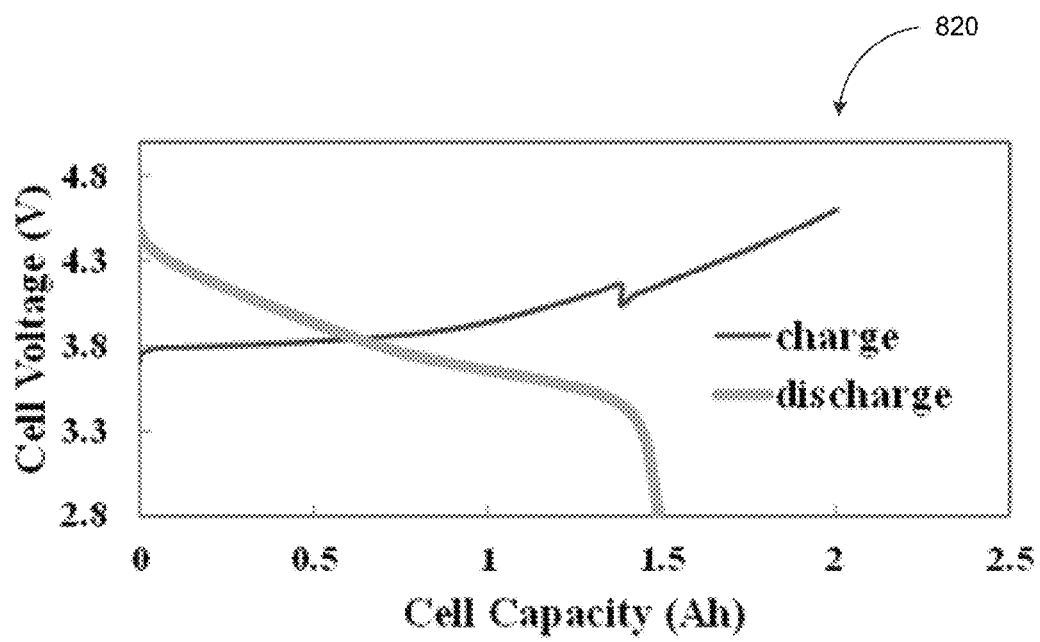
FIG. 8C depicts a line graph illustrating a charge profile and a discharge profile of a battery cell consistent with implementations of the current subject matter.

FIG. 8C depicts a line graph 820 illustrating a charge profile and a discharge profile of the battery cell 100 consistent with implementations of the current subject matter. Referring to FIG. 8C, the line graph 820 illustrates the capacity of the battery cell 100 relative to the charge voltage and the discharge voltage of the battery cell 100, as measured at room temperature. As shown in FIG. 8C, when the battery cell 100 is configured as the sample cell 3, the ratio of discharge capacity relative to charge capacity is approximately 74.2%. It should be appreciated that the discharge of the battery cell 100 is suspended at approximately 1.4 ampere-hour, thereby causing the voltage dip observed at around 1.4 ampere-hour.

Sample Cell 4

In some implementations of the current subject matter, the protective layer 120 is formed on the surface of the dual function current collector 110 by at least performing the process 700. For instance, the protective layer 120 is formed from polyvinylidene fluoride (PVDF LBG-1) (e.g., manufactured by Arkema Inc. of King of Prussia, Pa.) while the dual function current collector 110 is formed from copper (Cu) foil. As such, a binder solution is formed by dissolving the 10 grams of the polyvinylidene fluoride binder into 125 grams of N-methylpyrrolidone (NMP) and mixing for 120 minutes at 5000 revolutions per minute (RPM) to from a slurry. This slurry is coated onto the surface of copper (Cu) foil having a thickness of 9 microns. The coating is performed using an automatic coating machine with the first heat zone set to approximately 130° C. and the second heat zone set to approximately 180° C. to remove the N-methylpyrrolidone present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.5}Mn_{0.3}CO_{0.2}O_2$). Here, 3 grams of a high molecular weight polyvinylidene fluoride (PVDF (high molecular weight)) binder and 2.8 grams of carbon is dissolved into 37.5 grams of N-methylpyrrolidone (NMP) and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 92.2 grams of lithium nickel manganese cobalt oxide ($LiNi_{0.5}Mn_{0.3}Co_{0.2}O_2$) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130. Here, the separator 130 can have a thickness of approximately 25 microns.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate ($LiPF_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/70 C rate. The activated battery cell 100 is allowed to rest for 7 additional days at which point the battery cell 100 is punctured, under vacuum, to release any gases before being resealed.

Figure 8D:
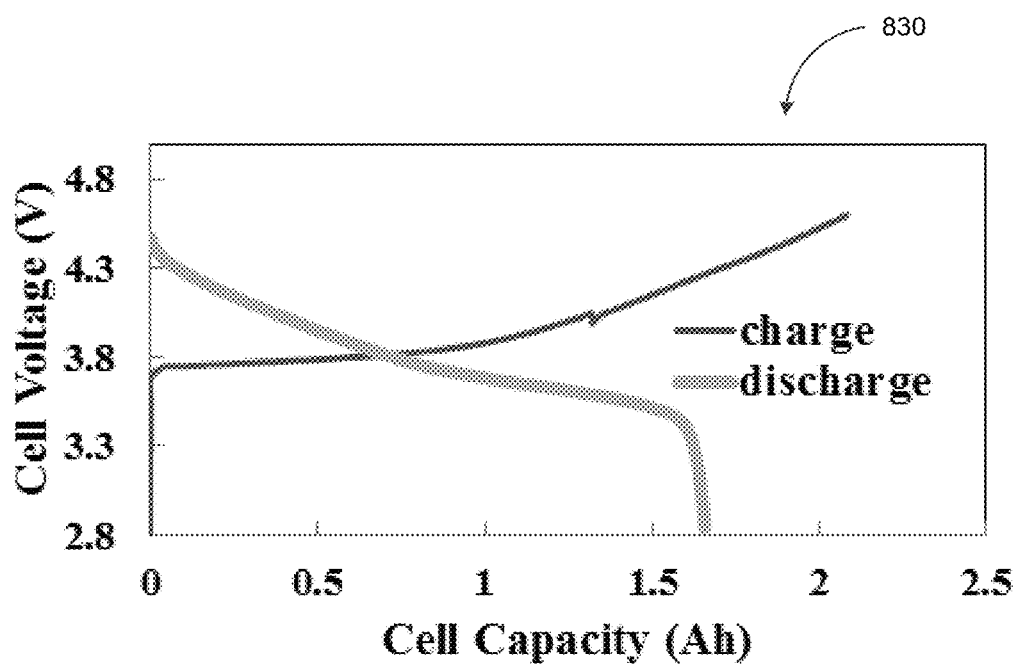
FIG. 8D depicts a line graph illustrating a charge profile and a discharge profile of a battery cell consistent with implementations of the current subject matter.

FIG. 8D depicts a line graph 830 illustrating a charge profile and a discharge profile of the battery cell 100 consistent with implementations of the current subject matter. Referring to FIG. 8D, the line graph 830 illustrates the capacity of the battery cell 100 relative to the charge voltage and the discharge voltage of the battery cell 100, as measured at room temperature. As shown in FIG. 8D, when the battery cell 100 is configured as the sample cell 4, the ratio of discharge capacity relative to charge capacity is approximately 80%. It should be appreciated that the discharge of the battery cell 100 is suspended at approximately 1.3 ampere-hour, thereby causing the voltage dip observed at around 1.3 ampere-hour.

Sample Cell 5

In some implementations of the current subject matter, the protective layer 120 is formed on the surface of the dual function current collector 110 by at least performing the process 700. For instance, the protective layer 120 is formed from polyvinylidene fluoride (PVDF LBG-1) (e.g., manufactured by Arkema Inc. of King of Prussia, Pa.) while the dual function current collector 110 is formed from copper (Cu) foil. As such, a binder solution is formed by dissolving the 10 grams of the polyvinylidene fluoride binder into 125 grams of N-methylpyrrolidone (NMP) and mixing for 120 minutes at 5000 revolutions per minute (RPM) to from a slurry. This slurry is coated onto the surface of copper (Cu) foil having a thickness of 9 microns. The coating is performed using an automatic coating machine with the first heat zone set to approximately 130° C. and the second heat zone set to approximately 180° C. to remove the N-methylpyrrolidone present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.4}Mn_{0.3}CO_{0.2}O_2$). Here, 2.1 grams of a high molecular weight polyvinylidene fluoride (PVDF (high molecular weight)), 0.2 grams of BM700 (e.g., manufactured by Zeon Corporation of Tokyo Japan) dissolved in 2 grams of N-methylpyrrolidone (NMP), and 2.8 grams of carbon black is dissolved into 26.25 grams of N-methylpyrrolidone and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 93.1 grams of lithium nickel manganese cobalt oxide ($LiNi_{0.4}Mn_{0.3}CO_{0.3}O_2$) (NMC433) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130. Here, the separator 130 can have a thickness of approximately 40 microns.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate ($LiPF_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/70 C rate. The activated battery cell 100 is allowed to rest for 7 additional days at which point the battery cell 100 is punctured, under vacuum, to release any gases before being resealed.

Figure 8E:
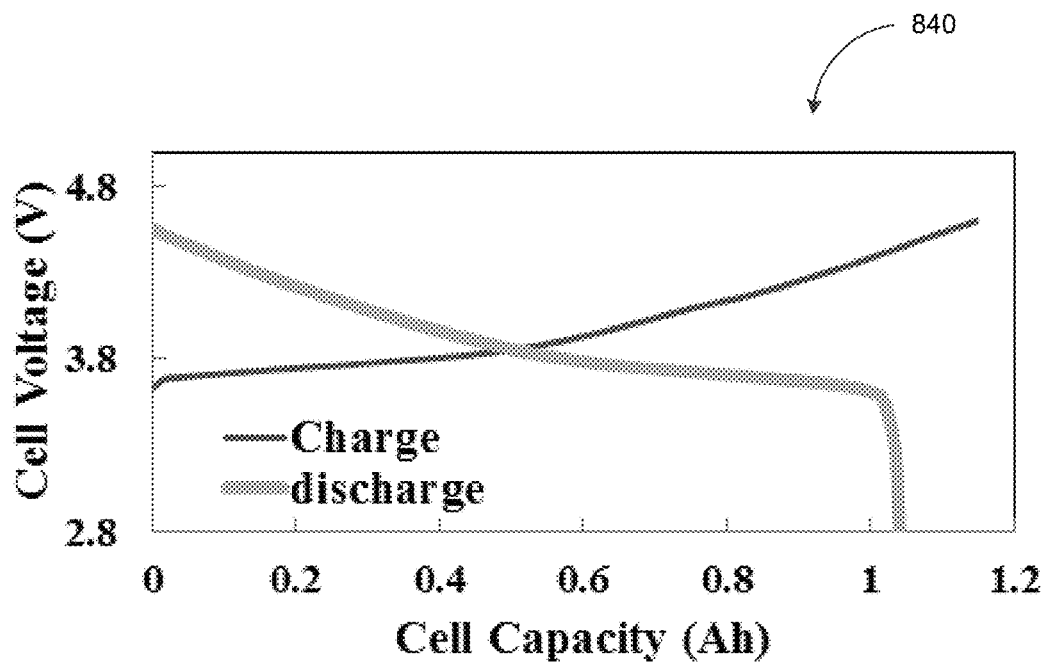
FIG. 8E depicts a line graph illustrating a charge profile and a discharge profile of a battery cell consistent with implementations of the current subject matter.

FIG. 8E depicts a line graph 840 illustrating a charge profile and a discharge profile of the battery cell 100 consistent with implementations of the current subject matter. Referring to FIG. 8E, the line graph 840 illustrates the capacity of the battery cell 100 relative to the charge voltage and the discharge voltage of the battery cell 100, as measured at room temperature. As shown in FIG. 8E, when the battery cell 100 is configured as the sample cell 5, the ratio of discharge capacity relative to charge capacity is approximately 90%.

Figure 8F:
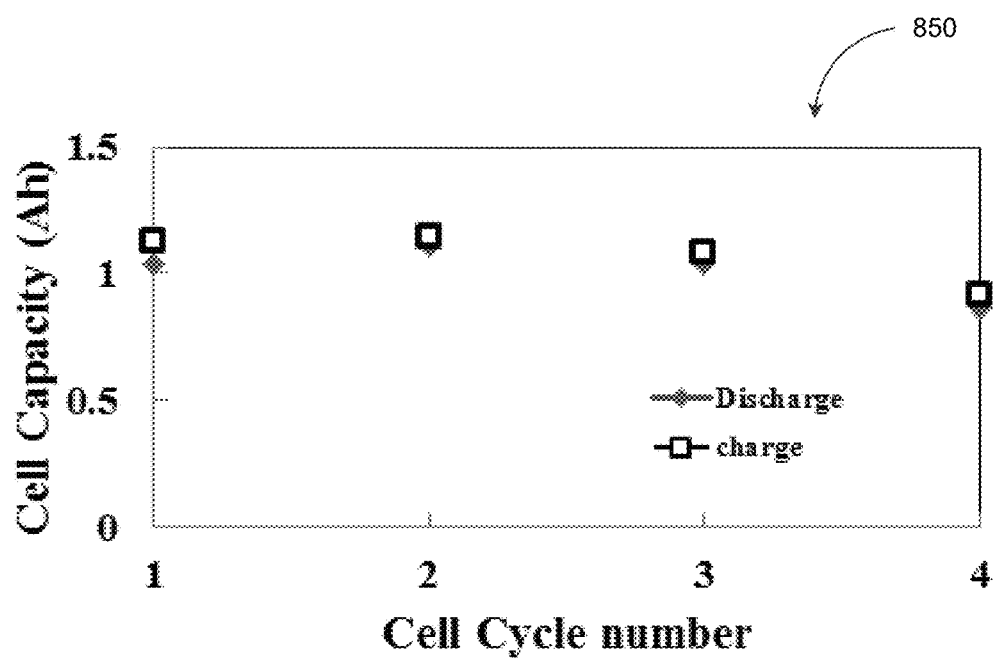
FIG. 8F depicts a scatter plot illustrating a cycle life performance of a battery cell consistent with implementations of the current subject matter.

FIG. 8F depicts a scatter plot 850 illustrating a cycle life performance of the battery cell 100 consistent with implementations of the current subject matter. Referring to FIG. 8F, the scatter plot 850 illustrates the cycle life of the battery cell 100 (e.g., measured in the number of complete charge and discharge cycles supported by the battery cell 100 prior to depletion) relative to the capacity of the battery cell 100, when the battery cell is configured as the sample cell 5.

Sample Cell 6

In some implementations of the current subject matter, the protective layer 120 is formed on the surface of the dual function current collector 110 by at least performing the process 700. For instance, the protective layer 120 is formed from polyethylene oxide (PEO) and the crosslinking agent carboxymethyl cellulose (CMC) while the dual function current collector 110 is formed from copper (Cu) foil. As such, a binder solution is formed by dissolving the 50 grams of polyethylene oxide and 50 grams of carboxymethyl cellulose into 1000 grams of deionized water. The resulting mixture may be mixed for 120 minutes at 5000 revolutions per minute (RPM) to from a slurry. This slurry can then be coated onto the surface of copper (Cu) foil having a thickness of 9 microns. The coating is performed using an automatic coating machine with the first heat zone set to approximately 130° C. and the second heat zone set to approximately 180° C. to remove the deionized water present in the slurry. When dried, the protective layer 120 can have an average thickness of approximately 2-15 microns.

In some implementations of the current subject matter, the first electrode 140 (e.g., cathode) is formed on top of the current collector 150 by at least performing the process 720. For instance, the first electrode 140 is formed from a lithium nickel manganese cobalt oxide ($LiNi_{0.4}Mn_{0.3}CO_{0.2}O_2$). Here, 2.1 grams of a high molecular weight polyvinylidene fluoride (PVDF (high molecular weight), 0.2 grams of BM700 (e.g., manufactured by Zeon Corporation of Tokyo, Japan) dissolved in 2 grams of N-methylpyrrolidone (NMP), and 2.8 grams of carbon black is dissolved into 26.25 grams of N-methylpyrrolidone and mixed for 15 minutes at 6500 revolutions per minute to form a binder solution. Thereafter, 1.8 grams of graphite is added to this binder solution and mixed for 15 minutes at 6500 revolutions per minute to form a first slurry. A flowable second slurry can then be formed by adding 93.1 grams of lithium nickel manganese cobalt oxide ($LiNi_{0.4}Mn_{0.3}CO_{0.3}O_2$) (NMC433) to this first slurry and mixing for 30 minutes at 6500 revolutions per minute. Here, additional amounts of N-methylpyrrolidone may be added to adjust the viscosity of the second slurry. The resulting second slurry (e.g., electrode slurry) is coated onto the current collector 150, which may be aluminum (Al) foil having a thickness of 15 microns. The coating may be performed using an automatic coating machine with the first heat zone set to approximately 80° C. and the second heat zone set to approximately 130° C. to remove the N-methylpyrrolidone present in the second slurry. When dried, the first electrode 140 and the current collector 150 can have a combined thickness of approximately 300 microns, which is further compressed to a thickness of approximately 225 microns.

In some implementations of the current subject matter, the battery cell 100 is formed by performing the process 750. Thus, forming the battery cell 100 can include drying the dual function current collector 110, the protective layer 120, and the first electrode 140 at 125° C. for 16 hours. The dual function current collector 110, the protective layer 120, and the first electrode 140 is further punched into pieces using an electrode tab. A jelly roll is formed from the dual function current collector 110, the protective layer 120, the separator 130, the first electrode 140, and the current collector 150. For instance, the dual function current collector 110, the protective layer 120, the separator 130, the first electrode 140, and the current collector 150 is laminated such that the dual function current collector 110 and the protective layer 120 are on one side of the separator 130 while the first electrode 140 and the current collector 150 are on the opposite side of the separator 130.

This jelly roll is inserted flat into an aluminum (Al) composite bag that has been dried for 16 hours in a vacuum oven set to 70° C. The aluminum composite bag is filed with an organic carbonate based liquid electrolyte containing lithium hexafluorophosphate ($LiPF_6$) before the aluminum composite bag is sealed to form the battery cell 100. The battery cell 100 may be allowed to rest for approximately 16 hours before being subject to an activation process that includes charging, at room temperature, the battery cell 100 to 4.6 volts at a rate of 1/10 C rate. The activated battery cell 100 is allowed to rest for 7 additional days at which point the battery cell 100 is punctured, under vacuum, to release any gases before being resealed.

Figure 8G:
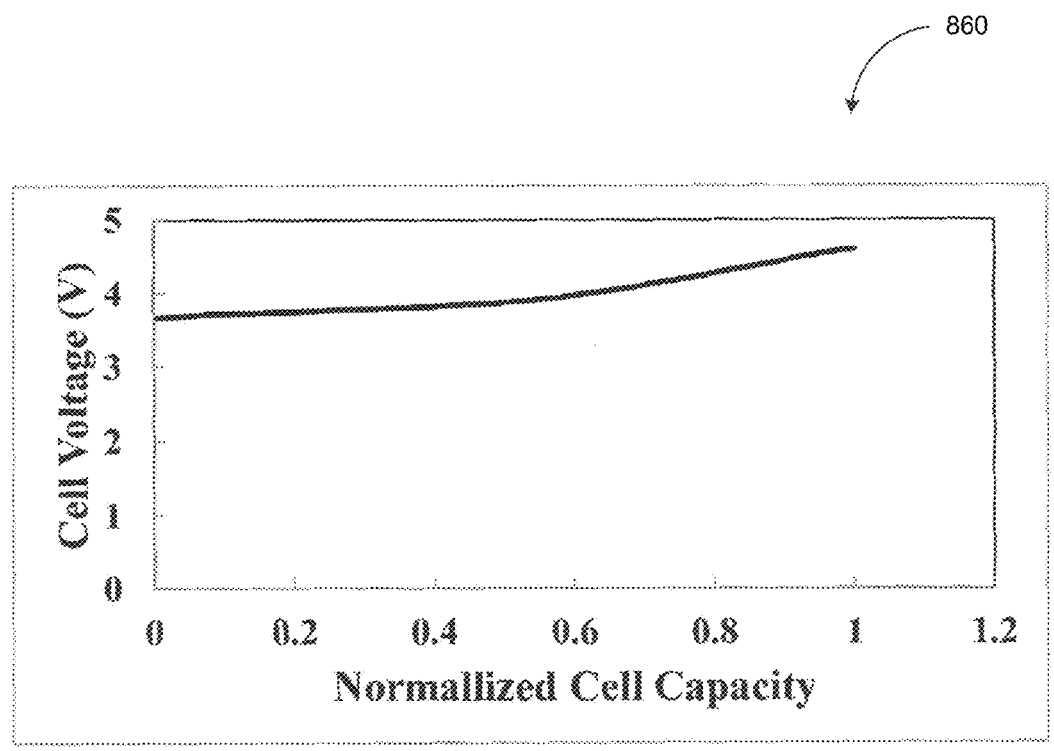
FIG. 8G depicts a line graph illustrating a charge profile of a battery cell consistent with implementations of the current subject matter.

FIG. 8G depicts a line graph 860 illustrating a charge profile of the battery cell 100 consistent with implementations of the current subject matter. Referring to FIG. 8G, the line graph 860 illustrates the capacity of the battery cell 100 relative to the charge voltage voltage of the battery cell 100, as measured at room temperature.

Sample Protective Layer

In some implementations of the current subject matter, the protective layer 120 is formed from polyamideimides, polyimides, polytetrafluoroethylene (PTFE), carboxymethyl cellulose (CMC), polyvinylidene fluoride (PVDF), polyvinyl alcohol (PVA), styrene butadiene rubber (SBR), and/or mixtures thereof. In some implementations of the current subject matter, the protective layer 120 is formed from a polyimide. In some implementations of the current subject matter, the protective layer 120 is formed from a carboxymethyl cellulose. In some implementations of the current subject matter, the protective layer 120 is formed from a crosslinkable polymer. Suitable crosslinkable polymers can include, for example, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and mixtures thereof. In some implementations of the current subject matter, the crosslinkable polymer is a polyamideimide. In some implementations of the current subject matter, the crosslinkable polymer is a polyimide. In some implementations of the current subject matter, the crosslinkable polymer is a carboxymethyl cellulose.

In some implementations of the current subject matter, the protective layer 120 is formed from a crosslinked polymer. Suitable crosslinked polymers can include, for example, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and/or mixtures thereof. In some implementations of the current subject matter, the crosslinked polymer is a polyamideimide. In some implementations of the current subject matter, the crosslinked polymer is a polyimide. In some implementations of the current subject matter, the crosslinked polymer is a carboxymethyl cellulose.

In some implementations of the current subject matter, the protective layer 120 is formed from a thermally crosslinkable polymer. Suitable thermally crosslinkable polymers can include, for example, polybenzophenones, polyacrylates, polyvinyls, polystyrenes, polysulfones, 2,3-dihydrofuran-containing polymers, carboxymethyl celluloses (CMC), polyamideimides, polyimides, styrene-containing copolymers, and/or mixtures thereof. In some implementations of the current subject matter, the thermally crosslinkable polymer is a polyamideimide. In some implementations of the current subject matter, the thermally crosslinkable polymer is a polyimide. In some implementations of the current subject matter, the thermally crosslinkable polymer is a carboxymethyl cellulose.

In some implementations of the current subject matter, the protective layer 120 is formed from a photo crosslinkable polymer. Suitable photo crosslinkable polymers can include, for example, polybenzophenones, polyacrylates, polyvinyls, polystyrenes, polysulfones, 2,3-dihydrofurancontaining polymers, styrene-containing copolymers, and/or mixtures thereof.

In some implementations of the current subject matter, the protective layer 120 is formed from its precursors via polymerization on the surface of the core of the coated electroactive particle (e.g., the dual function current collector 110) provided herein. In some implementations of the current subject matter, the precursors of a polymer is monomers of the polymer. In some implementations of the current subject matter, the precursors of a polymer is crosslinkable polymers. In some implementations of the current subject matter, the polyamideimide forming the protective layer 120 is formed from a polyamideimide via crosslinking on the surface of the core of the coated electroactive particle (e.g., the dual function current collector 110) provided herein. In some implementations of the current subject matter, the polyimide forming the protective layer 120 is formed from a polyimide via crosslinking on the surface of the core of the coated electroactive particle provided herein (e.g., the dual function current collector 110).

In some implementations of the current subject matter, the protective layer 120 is formed from a polyamideimide, polyimide, and/or a mixture thereof. In some implementations of the current subject matter, the polyamideimide is aromatic, aliphatic, cycloaliphatic, and/or a mixture thereof. In some implementations of the current subject matter, the polyamideimide is an aromatic polyamideimide. In some implementations of the current subject matter, the polyamideimide is an aliphatic polyamideimide. In some implementations of the current subject matter, the polyamideimide is a cycloaliphatic polyamideimide. In some implementations of the current subject matter, the polyimide is aromatic, aliphatic, cycloaliphatic, and/or a mixture thereof. In some implementations of the current subject matter, the polyimide is an aromatic polyimide. In some implementations of the current subject matter, the polyimide is an aliphatic polyimide. In some implementations of the current subject matter, the polyimide is a cycloaliphatic polyimide.

In some implementations of the current subject matter, the protective layer 120 is formed from TORLON® AI-30, TORLON® AI-50, TORLON® 4000, or TORLON®4203L (e.g., manufactured by Solvay Advanced Polymers, L.L.C. of Augusta, Ga.). Alternately and/or additionally, the protective layer 120 is formed from U-VARNISH® (e.g., manufactured by UBE American Inc. of New York, N.Y.). In some implementations of the current subject matter, the protective layer 120 is formed from TORLON® AI-30. In some implementations of the current subject matter, the protective layer 120 is formed from TORLON® AI-50. In some implementations of the current subject matter, the protective layer 120 is formed from TORLON® 4000. In some implementations of the current subject matter, the protective layer 120 is formed from TORLON® 4203L. In some implementations of the current subject matter, the protective layer 120 is formed from U-VARNISH®. It should be appreciated that other suitable polyamideimide and polyimides can include those described in Loncrini and Witzel, *Journal of Polymer Science Part A-1: Polymer Chemistry* 1969, 7, 2185-2193; Jeon and Tak, *Journal of Applied Polymer Science* 1996, 60, 1921-1926; Seino et al., *Journal of Polymer Science Part A: Polymer Chemistry* 1999, 37, 3584-3590; Seino et al., *High Performance Polymers* 1999, 11, 255-262; Matsumoto, *High Performance Polymers* 2001, 13, S85-S92; Schab-Balcerzak et al., *European Polymer Journal* 2002, 38, 423-430; Eichstadt et al., *Journal of Polymer Science Part B: Polymer Physics* 2002, 40, 1503-1512; and Fang et al., *Polymer* 2004, 45, 2539-2549.

In some implementations of the current subject matter, the protective layer 120 is formed from a polyamideimide and a polyamine via polymerization on the surface of the core of the coated electroactive particle provided herein (e.g., the dual function current collector 110).

In some implementations of the current subject matter, the protective layer 120 is formed from an aromatic, aliphatic, and/or cycloaliphatic polyimide via a condensation reaction of an aromatic, aliphatic, or cycloaliphatic polyanhydride. For instance, a dianhydride is combined with an aromatic, aliphatic, and/or cycloaliphatic polyamine to form a polyamic acid. Alternately, the dianhydride is combined with a diamine and/or a triamine to form the polyamic acid. The polyamic acid can subsequently be subject to chemical and/or thermal cyclization to form the polyimide. In some implementations of the current subject matter, the protective layer 120 is formed from a polyanhydride and a polyamine via polymerization on the surface of the core of the coated electroactive particle provided herein (e.g., the dual function current collector 110).

In some implementations of the current subject matter, suitable polyanhydrides, polyamines, polyamideimide, and/or polyimides can include, for example, those described in Eur. Pat. App. Pub. Nos. EP 0450549 and EP 1246280; U.S. Pat. No. 5,504,128; and U.S. Pat. App. Pub. Nos. 2006/0099506 and 2007/0269718, the disclosures of which are incorporated herein by reference in their entirety.

In some implementations of the current subject matter, suitable polyanhydrides can include, for example, butanetetracarboxylic dianhydride, meso-1,2,3,4-butanetetracarboxylic dianhydride, dl-1,2,3,4-butanetetracarboxylic dianhydride, cyclobutane tetracarboxylic dianhydride, 1,2,3,4-cyclopentane tetracarboxylic dianhydride, cyclohexane tetracarboxylic dianhydride, 1,2,3,4-cyclohexanetetracarboxylic dianhydride, cis-1,2,3,4-cyclohexanetetracarboxylic dianhydride, trans-1,2,3,4-cyclohexanetetracarboxylic dianhydride, bicyclo[2.2.2]octane-2,3,5,6-tetracarboxylic 2,3:5,6-dianhydride, bicyclo[2.2.2]oct-7-ene-2,3,5,6-tetracarboxylic dianhydride, bicyclo[2.2.1]-heptane-2,3,5,6-tetracarboxylic 2,3:5,6-dianhydride, (4arH, 8acH)-decahydro-1,t,4t:5c,4-cyclohexene-1,1,2,2-tetracarboxylic 1,2:1,2-dianhydride, bicyclo[2.2.1]heptane-2-exo-3-exo-5-exo-tricarboxyl-5-endo-acetic dianhydride, bicyclo[4.2.0]oxetane-1,6,7,8-tetracarboxylic acid intramolecular dianhydride, 3,3',4,4'-diphenylsulfonetetracarboxylic dianhydride, 4,4'-hexafluoropropylidene bisphthalic dianhydride, 1,3-bis(3,4-dicarboxyphenyl)-1,1,3,3-tetramethyldisiloxane, and/or combinations thereof.

In some implementations of the current subject matter, suitable polyamines can include, for example, 4,4'-methylenebis(2,6-dimethylaniline), 4,4'-oxydianiline, m-phenylenediamine, p-phenylenediamine, benzidene, 3,5-diaminobenzoic acid, o-dianisidine, 4,4'-diaminodiphenyl methane, 4,4'-methylenebis(2,6-dimethylaniline), 1,4-diaminobutane, 1,6-diaminohexane, 1,7-diaminoheptane, 1,9-diaminononane, 1,10-diaminodecane, 1,12-diaminododecane, 5-amino-1,3,3-trimethylcyclohexanemethylamine, 2,5-bis(aminomethyl)bicyclo[2.2.1]heptane, 2,6-bis(aminomethyl)bicyclo[2.2.1]heptane, 2,4-diaminotoluene, 1,4-diamino-2-methoxybenzene, 1,4-diamino-2-phenylbenzene and 1,3-diamino-4-chlorobenzene, 4,4'-diaminobiphenyl, 2,2-bis(4-aminophenyl)propane, 2,2-bis[4-(4-aminophenoxy)phenyl]propane, 2,2-bis(4-aminophenyl)-1,1,1,3,3,3-hexafluoropropane, 2,2-bis(4-aminophenoxyphenyl) hexafluoropropane, 4,4'-diaminodiphenyl ether, 3,4-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, naphthalene diamines (including 1,8-diaminonaphthalene and 1,5-diaminonaphthalene), 2,6-diaminopyridine, 2,4-diaminopyrimidine, 2,4-diamino-s-triazine, 1,8-diamino-4-(aminomethyl)octane, bis[4-(4-aminophenoxy)-phenyl]sulfone, 3,3'-dihydroxy-4,4'-diaminobiphenyl, 2,2-bis(3-amino-4-hydroxyphenyl) hexafluoropropane, 2,2-bis(3-hydroxy-4-aminophenyl) propane, and/or combinations thereof.

In some implementations of the current subject matter, the polyimide is poly(4,4'-phenyleneoxyphenylene pyromellitic imide) and/or poly(4,4'-phenyleneoxyphenylene-co-1,3-phenylenebenzophenonetetracarboxylic diimide).

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A battery, comprising:
   a separator;
   a first current collector;
   a protective layer disposed on the first current collector, the protective layer comprising a polymer and/or a polymer composite that is impenetrable to dendrites comprising a first electrode that is formed in situ between the protective layer and the first current collector, the first current collector and the protective layer being disposed on one side of the separator, and the protective layer being non-ionically conductive in an absence of an electrolyte; and
   a second electrode, the second electrode being disposed on an opposite side of the separator as the first current collector and the protective layer;
   wherein subjecting the battery to an activation process causes metal to be extracted from the second electrode and deposited between the first current collector and the protective layer, wherein the deposit of the metal forms the first electrode between the first current collector and the protective layer, and wherein the protective layer prevents the dendrites comprising the first electrode from penetrating the separator.

2. The battery of claim 1, wherein the activation process comprises charging the battery.

3. The battery of claim 1, wherein the activation process comprising charging the battery at less than ½ C rate and/or greater than 2 volts.

4. The battery of claim 1, wherein the first current collector comprises copper (Cu) and/or plated copper.

5. The battery of claim 1, wherein the first current collector comprises copper foil, stainless steel foil, titanium (Ti) foil, nickel (Ni) plated copper foil, aluminum (Al) plated copper foil, and/or titanium plated copper foil.

6. The battery of claim 1, wherein the first current collector has a thickness of 10 microns.

7. The battery of claim 1, wherein the second electrode is formed from a metal oxide, a metal fluoride, a metal sulfide, and/or a doped salt.

8. The battery of claim 1, wherein the second electrode is formed from a lithium cobalt oxide ($LiCoO_2$), lithium nickel cobalt oxide ($LiNiCoO_2$), lithium manganese nickel cobalt oxide ($LiNiMnCoO_2$), lithium manganese silicon oxide ($Li_2MnSiO_4$), lithium iron phosphate ($LiFePO_4$), lithium fluoride (LiF), and/or lithium sulfide ($Li_2S$).

9. The battery of claim 1, wherein the metal extracted from the second electrode comprises lithium metal.

10. The battery of claim 1, wherein the protective layer is formed from a crosslinked polymer and/or a non-crosslinked polymer.

11. The battery of claim 1, wherein the protective layer further includes one or more additives, and wherein the one or more additives comprise ceramic particles, metal salt particles, and/or metal stabilizers.

12. The battery of claim 1, wherein the battery further includes the electrolyte, and wherein a presence of the electrolyte renders the protective layer ionically conductive.

13. The battery of claim 12, wherein the electrolyte comprises a liquid electrolyte, the liquid electrolyte including metal ions, and wherein the liquid electrolyte further includes one or more organic solvents.

14. The battery of claim 13, wherein the metal irons comprise lithium ions, and wherein the one or more organic solvents comprise ethylene carbonate (($CH_2O)_2CO$) and/or lithium hexafluorophosphate ($Li_1PF_6$).

15. The battery of claim 12, wherein the electrolyte comprises a solid-state electrolyte.

16. The battery of claim 15, wherein the solid-state electrolyte comprises a glass-ceramic binary sulfide electrolyte and/or a polymer electrolyte.

17. The battery of claim 1, wherein the battery further comprises a second current collector, the second current collector being coupled with the second electrode.

18. The battery of claim 17, wherein the battery further comprises a safety layer deposited on the second current collector, and wherein the safety layer is configured to respond to a temperature trigger and/or a voltage trigger.

19. The battery of claim 1, wherein the activation process causes a reduction at the second electrode, the reduction extracting metal from the second electrode, and the metal extracted from the second electrode being deposited between the first current collector and the protective layer to form the first electrode in situ between the first current collector and the protective layer.

* * * * *